United States Patent
Idehara et al.

(10) Patent No.: US 7,613,730 B2
(45) Date of Patent: Nov. 3, 2009

(54) MEDIA DELIVERING APPARATUS AND MEDIA RECEIVING APPARATUS

(75) Inventors: Yuichi Idehara, Tokyo (JP); Junichi Yokosato, Tokyo (JP); Fuminobu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 63 days.

(21) Appl. No.: 10/589,958

(22) PCT Filed: Mar. 2, 2004

(86) PCT No.: PCT/JP2004/002541

§ 371 (c)(1),
(2), (4) Date: Aug. 18, 2006

(87) PCT Pub. No.: WO2005/086009

PCT Pub. Date: Sep. 15, 2005

(65) Prior Publication Data

US 2007/0174881 A1    Jul. 26, 2007

(51) Int. Cl.
*G06F 7/00* (2006.01)
*G06F 15/16* (2006.01)

(52) U.S. Cl. .......................... 707/104.1; 707/5; 707/10

(58) Field of Classification Search ............. 707/104.1; 455/412.2; 379/88.11, 88.12; 340/500; 709/206–223; 725/90–98, 112–120
See application file for complete search history.

(56) References Cited

U.S. PATENT DOCUMENTS

| | | | | |
|---|---|---|---|---|
| 6,983,310 B2 * | 1/2006 | Rouse et al. | | 709/206 |
| 7,310,514 B2 * | 12/2007 | Shinohara | | 455/412.2 |
| 2002/0154160 A1 | 10/2002 | Hosokawa | | |
| 2002/0194282 A1 * | 12/2002 | Saito et al. | | 709/206 |

FOREIGN PATENT DOCUMENTS

| | | |
|---|---|---|
| JP | 2002-278872 A | 9/2002 |
| JP | 2003-009113 A | 1/2003 |
| JP | 2003-009120 A | 1/2003 |
| JP | 2003-163847 A | 6/2003 |
| JP | 2003-208384 A | 7/2003 |
| JP | 2003-233552 A | 8/2003 |
| JP | 2003-330856 A | 11/2003 |
| JP | 2004-046789 A | 2/2004 |

* cited by examiner

*Primary Examiner*—Cam Y Truong
*Assistant Examiner*—Cecile Vo
(74) *Attorney, Agent, or Firm*—Birch, Stewart, Kolasch & Birch, LLP

(57) ABSTRACT

A media delivering apparatus and method for delivering media data via a network to a media receiving apparatus is disclosed. The delivering apparatus includes a parameter acquiring unit which acquires both a communication capability of the network, and the receiving capability of the media receiving apparatus. A media selecting unit selects media data to be delivered based on both the degree of media importance assigned to each media data and at least the one of the communication capability of the network and the receiving capability of the media receiving apparatus. A transmission-data generating unit generates metadata in which both address information about each selected media data and presentation layout information are described. A data transmitting unit delivers the metadata to the media receiving apparatus by way of the network, and a media communication unit delivers the media data in response to a request from the media receiving apparatus.

12 Claims, 30 Drawing Sheets

FIG.6
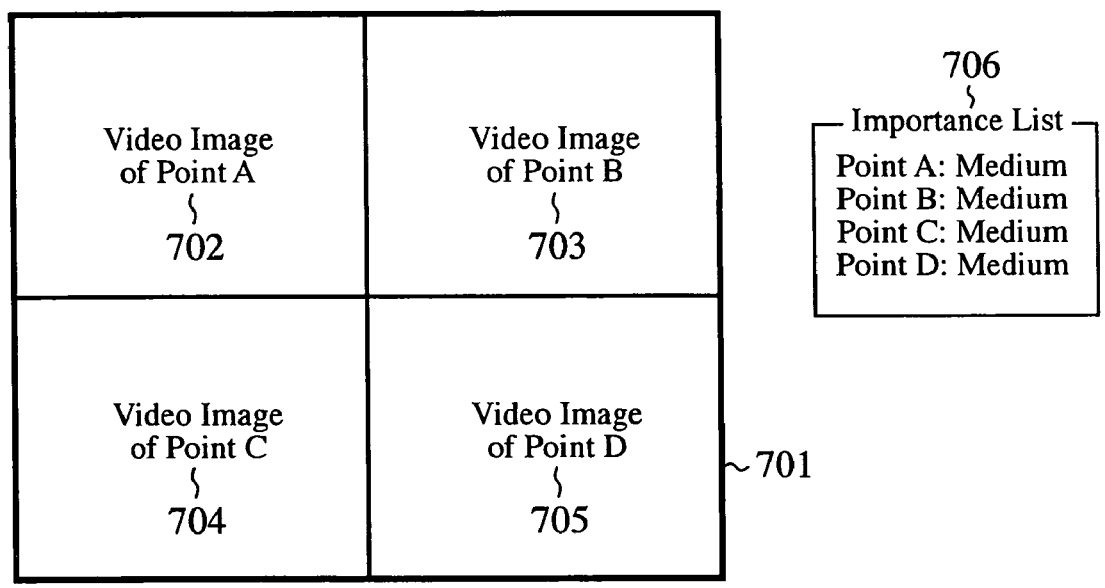
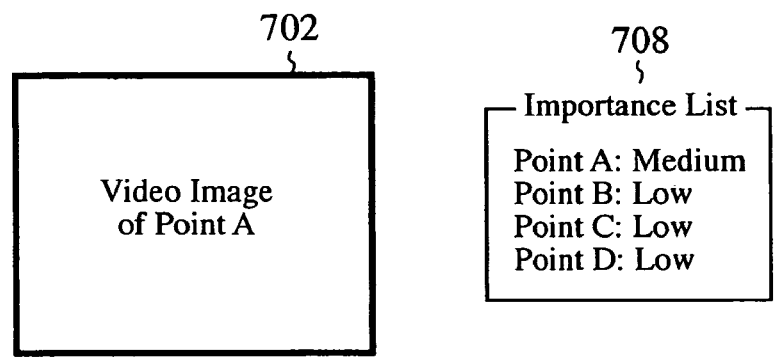

FIG.7

```
<smil>
<head>
<layout>
<root-layout width="640" height="480"/>
<region id="topleft" left="0" top="0" width="320" height="240" />
<region id="topright" left="320" top="0" width="320" height="240" />
<region id="bottomleft" left="0" top="240" width="320" height="240" />
<region id="bottomright" left="320" top="240" width="320" height="240" />
</layout>
</head>
<body>
<par>
<video region="topleft" src="rtsp://server/A.mp4" />
<video region="topright" src="rtsp://server/B.mp4" />
<video region="bottomleft" src="rtsp://server/C.mp4" />
<video region="bottomright" src="rtsp://server/D.mp4" />
</par>
</body>
</smil>
```

1301

1302 — `<smil>`
1303 — `<head>`
1304 — `<layout>`
1305 — `<root-layout ...>`
1306 — `<region ...>`
1307 — `<video region="topleft" ...>`
1308 — `<video region="topright" ...>`
1309 — `<video region="bottomleft" ...>`

```
<smil>
 <head>
  <layout>
   <root-layout width="640" height="600"/>
   <region id="sumnail1" left="0" top="0" width="160" height="120" />
   <region id="sumnail2" left="160" top="0" width="160" height="120" />
   <region id="sumnail3" left="320" top="0" width="160" height="120" />
   <region id="sumnail4" left="480" top="0" width="160" height="120" />
   <region id="important" left="0" top="120" width="640" height="480" />
  </layout>
 </head>
 <body>
  <par>
   <video region="sumnail1" src="rtsp://server/A.mp4" />
   <video region="sumnail2" src="rtsp://server/B.mp4" />
   <video region="sumnail3" src="rtsp://server/C.mp4" />
   <video region="sumnail4" src="rtsp://server/D.mp4" />
   <video region="important" src="rtsp://server/E.mp4" />
  </par>
 </body>
</smil>
```

FIG.13

```
<smil>
  <head>
    <layout>
      <root-layout width="160" height="120"/>
      <region id="one" left="0" top="0" width="160" height="120" />
    </layout>
  </head>
  <body>
    <seq repeat="indefinite" >
      <video region="one" src="rtsp://server/A.mp4" dur="30s" />
      <video region="one" src="rtsp://server/B.mp4" dur="30s" />
      <video region="one" src="rtsp://server/C.mp4" dur="30s" />
      <video region="one" src="rtsp://server/D.mp4" dur="30s" />
    </seq>
  </body>
</smil>
```

1401 (outer box), 1402 (<seq> line), 1403 (first <video> line)

FIG. 14

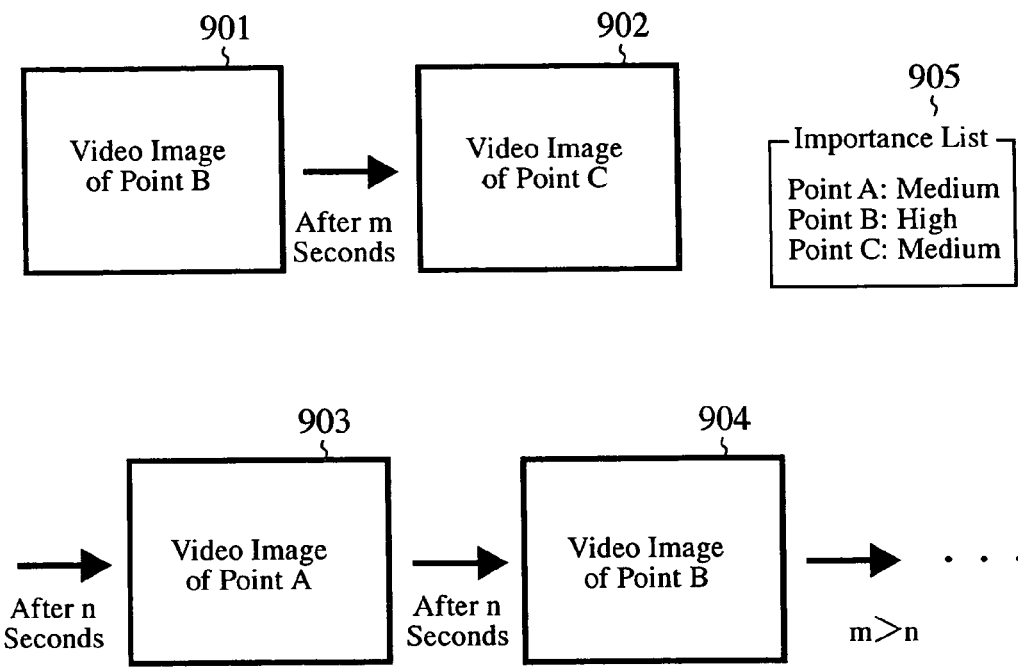

FIG. 15

```
<smil>
 <head>
  <layout>
   <root-layout width="160" height="120"/>
   <region id="one" left="0" top="0" width="160" height="120" />
  </layout>
 </head>
 <body>
  <seq repeat="indefinite" >
   <video region="one" src="rtsp://server/A.mp4" dur="30s" />
   <video region="one" src="rtsp://server/B.mp4" dur="60s" />
   <video region="one" src="rtsp://server/C.mp4" dur="30s" />
  </seq>
 </body>
</smil>
```
1601

FIG.16

```
<smil>
<head>
<switch>
<layout systemBitrate="1024" >
<root-layout width="640" height="480"/>
<region id="topleft" left="0" top="0" width="320" height="240" />
<region id="topright" left="320" top="0" width="320" height="240" />
<region id="bottomleft" left="0" top="240" width="320" height="240" />
<region id="bottomright" left="320" top="240" width="320" height="240" />
</layout>
<layout>
<root-layout width="160" height="120" />
<region id="one" left="0" top="0" width="160" height="120" />
</layout>
</switch>
</head>
<body>
<switch>
<par systemBitrate="1024" >
<video region="topleft" src="rtsp://server/A.mp4" />
<video region="topright" src="rtsp://server/B.mp4" />
<video region="bottomleft" src="rtsp://server/C.mp4" />
<video region="bottomright" src="rtsp://server/D.mp4" />
</par>
<seq repeat="indefinite" >
<video region="one" src="rtsp://server/A.mp4" dur="30s" />
<video region="one" src="rtsp://server/B.mp4" dur="30s" />
<video region="one" src="rtsp://server/C.mp4" dur="30s" />
<video region="one" src="rtsp://server/D.mp4" dur="30s" />
</seq>
</switch>
</body>
</smil>
```

Format of Change Command — 2401 add_elem {Absolute Node; <Additional Element, Attribute> (; Execution Time)}
add_attr {Absolute Node; Additional Attribute (; Execution Time)}
replace_elem {Absolute Node; <Replacement Element, Attribute> (; Execution Time)}
replace_attr {Absolute Node; Replacement Attribute (; Execution Time)}
delete_elem {Absolute Node; <Deletion Element> (; Execution Time)}
delete_attr {Absolute Node; Deletion Attribute (; Execution Time)}

2402

```
<smil>
  <head>
    <layout>
      <root-layout width="640" height="480"/>
      <region id="topleft" left="0" top="0" width="320" height="240" />
      <region id="topright" left="320" top="0" width="320" height="240" />
      <region id="bottomleft" left="0" top="240" width="320" height="240" />
      <region id="bottomright" left="320" top="240" width="320" height="240" />
    </layout>
  </head>
  <body>
    <par dur="600s">
      <video region="topleft" src="rtsp://server/A.mp4" begin="8:30"/>
      <video region="topright" src="rtsp://server/B.mp4" begin="14:10"/>
      <video region="bottomleft" src="rtsp://server/C.mp4" begin="12:30"/>
      <video region="bottomright" src="rtsp://server/D.mp4" begin="10:20"/>
    </par>
  </body>
</smil>
```

Absolute Node Correspondence Table — 2403

```
replace_attr {1,2,1,2;src="rtsp://server/E.mp4"}
replace_attr {1,2,1,5;src="rtsp://server/B.mp4"}
```
~1901

FIG.26

```
delete_elem {1,2,1,3}
delete_elem {1,2,1,1}
```
~2001

2002

```
add_elem{1,2,1,1;<video region="one"src="rtsp://server/A.mp4"dur="30s"/>}
add_attr{1,2,1,2;dur="60s"}
add_elem{1,2,1,3;<video region="one"src="rtsp://server/C.mp4"dur="30s"/>}
```

FIG.29

2104 — Importance List (At 14:00)
Point A: Medium
Point B: Medium
Point C: Medium
Point D: Medium
Point E: High
Point F: Low

→

2105 — Importance List (At 14:10)
Point A: Medium
Point B: Highest
Point C: Medium
Point D: Medium
Point E: High
Point F: Low

```
<smil>
<head>
<layout>
  <root-layout width="640" height="600"/>
  <region id="sumnail1" left="0" top="0" width="160" height="120" />
  <region id="sumnail2" left="160" top="0" width="160" height="120" />
  <region id="sumnail3" left="320" top="0" width="160" height="120" />
  <region id="sumnail4" left="480" top="0" width="160" height="120" />
  <region id="important" left="0" top="120" width="640" height="480" />
</layout>
</head>
<body>
<seq>
  <par dur="600s">
    <video region="sumnail1" src="rtsp://server/A.mp4" begin="14:00"/>
    <video region="sumnail2" src="rtsp://server/B.mp4" begin="14:00"/>
    <video region="sumnail3" src="rtsp://server/C.mp4" begin="14:00"/>
    <video region="sumnail4" src="rtsp://server/D.mp4" begin="14:00"/>
    <video region="important" src="rtsp://server/E.mp4" begin="14:00"/>
  </par>
  <par dur="1200s">
    <video region="sumnail1" src="rtsp://server/A.mp4" begin="14:10"/>
    <video region="sumnail2" src="rtsp://server/E.mp4" begin="14:10"/>
    <video region="sumnail3" src="rtsp://server/C.mp4" begin="14:10"/>
    <video region="sumnail4" src="rtsp://server/D.mp4" begin="14:10"/>
    <video region="important" src="rtsp://server/B.mp4" begin="14:10"/>
  </par>
</seq>
</body>
</smil>
```

2101 — (layout region)
2102, 2103 — (par elements)

FIG.31

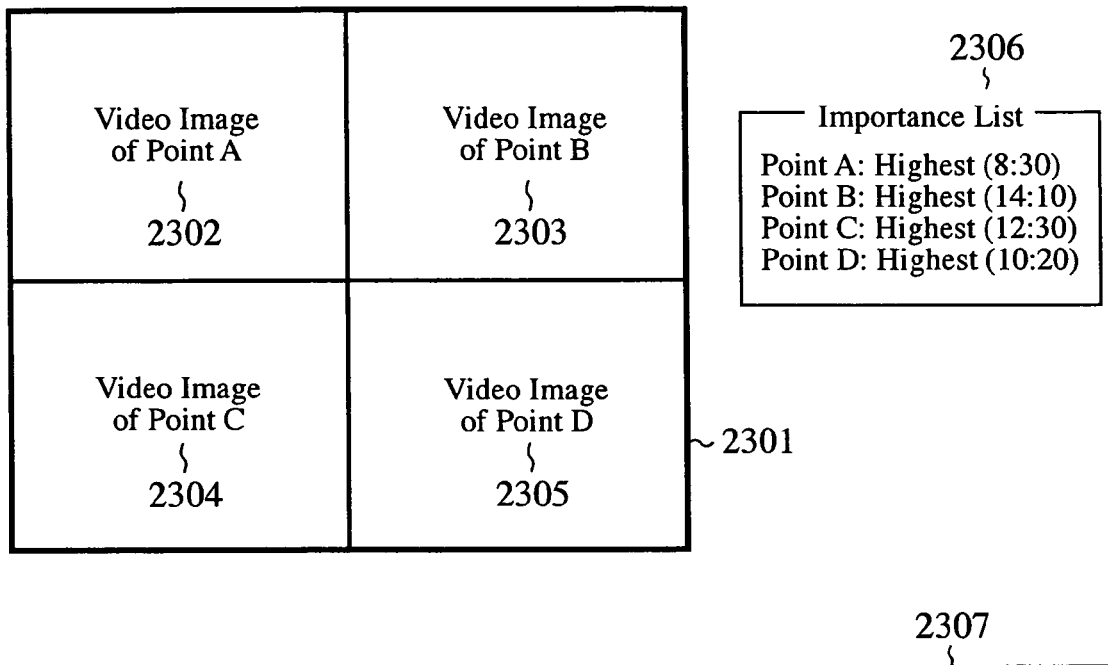

```
<smil>
 <head>
  <layout>
   <root-layout width="640" height="480"/>
   <region id="topleft" left="0" top="0" width="320" height="240" />
   <region id="topright" left="320" top="0" width="320" height="240" />
   <region id="bottomleft" left="0" top="240" width="320" height="240" />
   <region id="bottomright" left="320" top="240" width="320" height="240" />
  </layout>
 </head>
 <body>
  <par dur="600s">
   <video region="topleft" src="rtsp://server/A.mp4" begin="8:30"/>
   <video region="topright" src="rtsp://server/B.mp4" begin="14:10"/>
   <video region="bottomleft" src="rtsp://server/C.mp4" begin="12:30"/>
   <video region="bottomright" src="rtsp://server/D.mp4" begin="10:20"/>
  </par>
 </body>
</smil>
```

MEDIA DELIVERING APPARATUS AND MEDIA RECEIVING APPARATUS

FIELD OF THE INVENTION

The present invention relates to a media delivering apparatus which delivers media data by way of a network, and a media receiving apparatus which receives media data delivered thereto.

BACKGROUND OF THE INVENTION

In order to deliver two or more media data containing video data, audio data, etc. by way of a network and to present delivered media data faithfully according to a scenario written in XML (extensible markup language) or the like which is a description language, there is a necessity to bring the two or more media data into synchronization with one another. As a method of bringing two or more media data into synchronization with one another, JP,2003-9120,A discloses a delivery of two or more media data while dynamically carrying out frame skipping, image quality degradation or the like according to the conditions of the network.

FIG. 1 is a diagram explaining a media delivery system disclosed in the above-mentioned publication before examination. Servers Sa, Sb, and Sc each of which delivers media data are connected with a terminal device c which presents media data by way of a very thin channel, a thin channel, and a thick channel of a network 1, respectively. For example, while media data are simultaneously delivered from the servers Sa, Sb, and Sc, the server Sa connected to the very thin channel delivers media data in which frame skipping or image quality degradation is carried out so that the terminal device c can provide a synchronous presentation of the media data simultaneously delivered from the servers Sa, Sb, and Sc according to a scenario written in XML or the like.

A problem with the related art media delivering apparatus constructed as mentioned above is that since the receiving capability of the media receiving apparatus is not taken into consideration at the time of creating the scenario written in XML, there are cases where the scenario written in XML description cannot be executed depending on the receiving capability of the media receiving apparatus, that is, there is a possibility that unpresentable media data are delivered to the media receiving apparatus. Furthermore, there is a possibility that depending on the communication capability of the network, it takes time for the media receiving apparatus to adapt to a synchronous presentation of the two or more media data delivered thereto, and therefore a presentation of the two or more media data cannot be normally provided by the media receiving apparatus in the meantime. Another problem is thus that the media delivering apparatus cannot generate a scenario written in XML according to conditions at the time of delivery of the scenario, and the media receiving apparatus cannot normally present the two or more media data.

The present invention is made in order to solve the above-mentioned problems, and it is therefore an object of the present invention to provide a media delivering apparatus which generates metadata for delivering media data in consideration of the receiving capability of a media receiving apparatus and the communication capability of a network so that the media receiving apparatus can present the media data normally.

It is another object of the present invention to provide a media receiving apparatus which can present media data normally based on metadata delivered from a media delivering apparatus.

DISCLOSURE OF THE INVENTION

In accordance with the present invention, there is provided a media delivering apparatus which delivers media data to a media receiving apparatus by way of a network, the apparatus including: a parameter acquiring unit for acquiring at least one of a communication capability of the above-mentioned network, and a receiving capability of the above-mentioned media receiving apparatus; a media selecting unit for selecting media data to be delivered based on both a degree of media importance assigned to each of the above-mentioned media data and at least the one of the above-mentioned communication capability of the network and the above-mentioned receiving capability of the media receiving apparatus; a transmission-data generating unit for generating metadata in which both address information indicating a location of the selected media data and presentation layout information indicating a presentation layout of the above-mentioned media receiving apparatus which is determined based on both the degree of media importance of the selected media data and at least the one of the above-mentioned communication capability of the network and the above-mentioned receiving capability of the media receiving apparatus are described; a data transmitting unit for delivering the above-mentioned metadata to the above-mentioned media receiving apparatus by way of the above-mentioned network; and a media communication unit for delivering the above-mentioned media data in response to a request from the above-mentioned media receiving apparatus which has received the above-mentioned metadata.

The present invention offers an advantage of being able to normally present media data and being able to deliver media data which are suited for each media receiving apparatus.

BRIEF DESCRIPTION OF THE FIGURES

FIG. 6 is a diagram showing an example of a presentation layout in a case of simultaneously monitoring four points in accordance with embodiment 1 of the present invention;

FIG. 7 is a diagram showing an example of the metadata in accordance with embodiment 1 of the present invention;

FIG. 11 is a diagram showing an example of the metadata in accordance with embodiment 1 of the present invention;

FIG. 13 is a diagram showing an example of the metadata in accordance with embodiment 1 of the present invention;

FIG. 14 is a diagram showing an example of a presentation layout in a case of simultaneously monitoring three points in accordance with embodiment 1 of the present invention;

FIG. 15 is a diagram showing an example of the metadata in accordance with embodiment 1 of the present invention;

FIG. 16 is a diagram showing an example of the metadata in which conditional branching for determining the presentation layout in accordance with embodiment 1 of the present invention is included;

FIG. 24 is a diagram showing an example of definition of the format of a change command, and an example of the metadata in accordance with embodiment 1 of the present invention;

FIG. 25 is a diagram showing an example of the change command in accordance with embodiment 1 of the present invention;

FIG. 26 is a diagram showing an example of the change command in accordance with embodiment 1 of the present invention;

FIG. 29 is a diagram showing an example of the metadata in a case where a time-varying variation in a degree of media importance and a time when the degree of media importance is changed are known in advance in the media delivering apparatus in accordance with embodiment 2 of the present invention;

FIG. 31 is a diagram showing an example of a presentation layout and an example of the metadata in a case of simultaneously monitoring four points in the media delivery system in accordance with embodiment 2 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

This embodiment 1 will be explained by taking, as an example, a media delivering apparatus and a media receiving apparatus which handle, as media data, surveillance video image data encoded with MPEG-4 Visual. The media data itself can be anything as long as it is general media data such as video data or audio data. The application of the present invention is not limited to a surveillance system. Furthermore, assuming that metadata in which the features of corresponding media data are compactly described is written in SMIL (synchronized multimedia integration language) which is an XML-based multimedia presentation description language, and RTP (real time transport protocol, IETF RFC3550) is used as a media delivery protocol and RTSP (real time streaming protocol, IETF RFC2326) is used as a media delivery control protocol, this embodiment 1 will be explained. However, this embodiment is not limited to this specific example from a workable standpoint.

In accordance with this embodiment 1, the media delivering apparatus selects media data to be delivered based on the degree of media importance assigned to each media data and then delivers the selected media data to the media receiving apparatus so that the user can refer to the important media data on a priority basis using the media receiving apparatus. The media delivering apparatus may select two or more media data to be delivered depending on the degree of media importance assigned to each media data. The media delivering apparatus delivers the selected media data to the media receiving apparatus based on metadata which it dynamically creates according to the degree of media importance assigned to the media data so that the media receiving apparatus can receive the media data only by performing a synchronous presentation operation according to the metadata delivered thereto.

Figure 1:
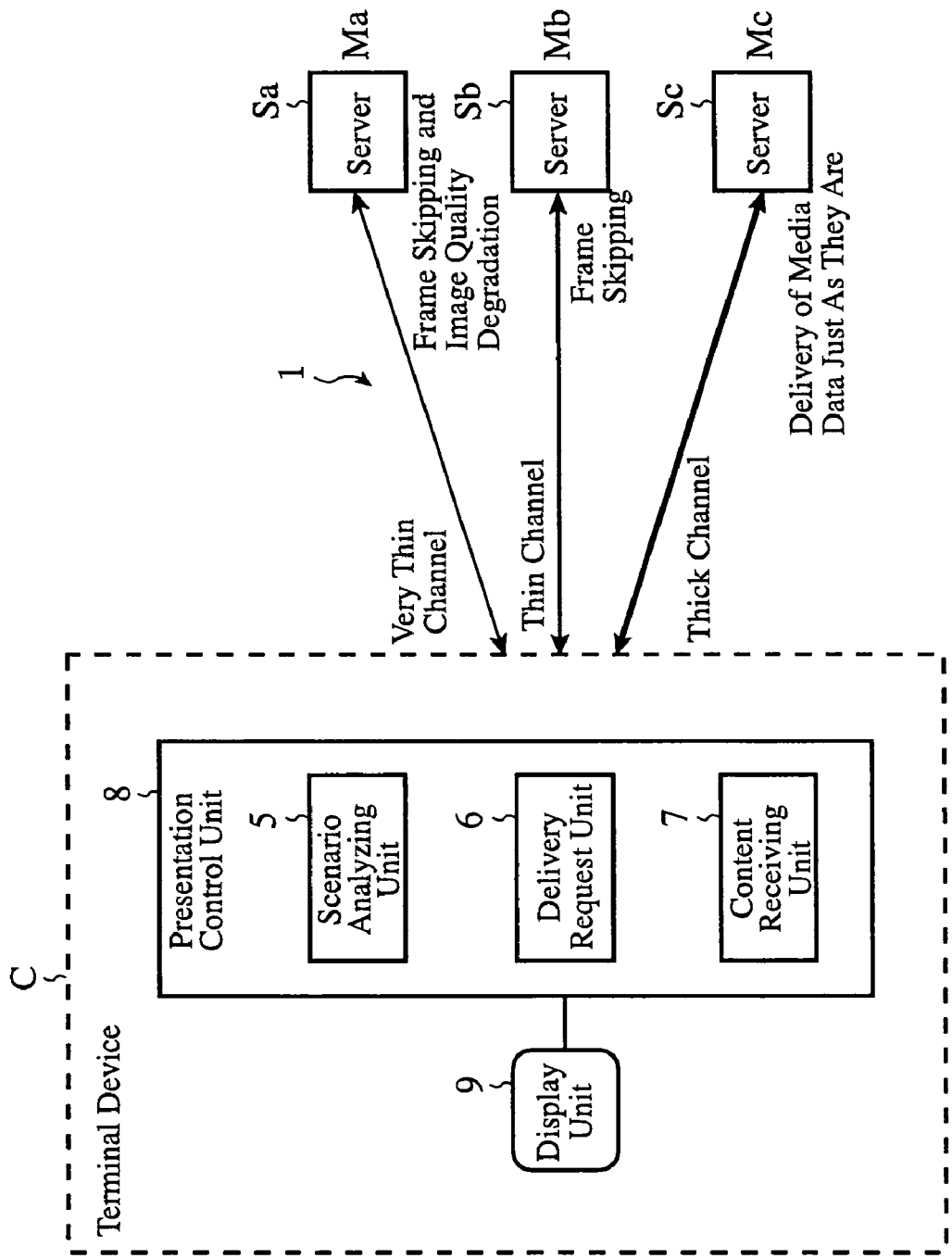
FIG. 1 is a diagram explaining a related art media delivery system.
Figure 2:
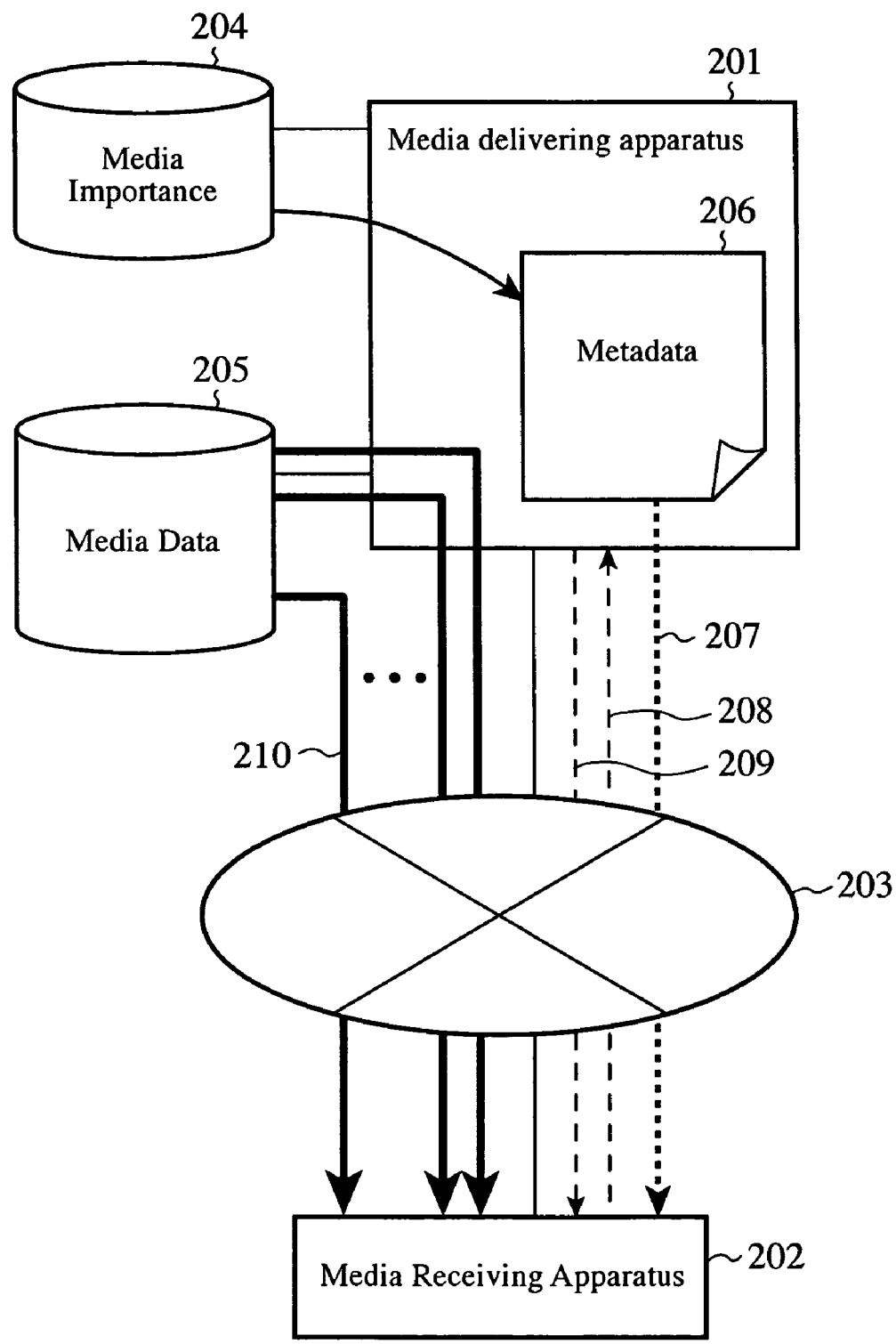
FIG. 2 is a diagram explaining the fundamental structure of a media delivery system which uses metadata in accordance with embodiment 1 of the present invention.

FIG. 2 is a diagram explaining the fundamental structure of a media delivery system which uses metadata in accordance with embodiment 1 of the present invention. In FIG. 2, the media delivering apparatus 201 is connected to the media receiving apparatus 202 by way of a network 203 so that it can access the degree of media importance 204 assigned to any media data 205 and any media data 205.

Next, the operation of the media delivery system shown in FIG. 2 will be explained.

There is one or more media data 205 in the media delivery system, and a degree of media importance 204 is assigned to each of the one or more media data 205. Each media data 205 has an address which is uniquely discriminable within the system. When the media delivering apparatus 201 receives a request for delivery of media data 205 from the media receiving apparatus 202, the media delivering apparatus 201 refers to the degree of media importance 204 assigned to each media data, selects one or more media data 205 to be delivered by setting the degree of media importance 204 referred as a parameter, creates metadata 206 in which address information indicating the location of each of the selected one or more media data 205 and presentation layout information indicating a layout of the one or more media data on the screen of the media receiving apparatus 202 are described, and carries out a delivery 207 of the selected one or more metadata 206 to the media receiving apparatus 202.

The media delivering apparatus 201 creates metadata 206 by setting the degree of media importance 204 assigned to each of the selected one or more metadata as parameters. For example, the media delivering apparatus 201 selects media data 205 based on a threshold indicating "a medium degree of importance", and creates metadata 206. The media receiving apparatus 202 receives the metadata 206, and issues a request 208 for delivery of the media data 205 based on the address information described in the metadata. When receiving the request 208, the media delivering apparatus 201 sends a request response 209 to the media receiving apparatus 202, and carries out a delivery 210 of the requested media data 205 to the media receiving apparatus. The media receiving apparatus 202 receives the media data 205 delivered thereto, and presents it based on the presentation layout information described in the metadata 206. When receiving two or more media data 205 simultaneously, the media receiving apparatus 202 presents them while bringing the two or more media data 205 into synchronization with one another.

Figure 3:
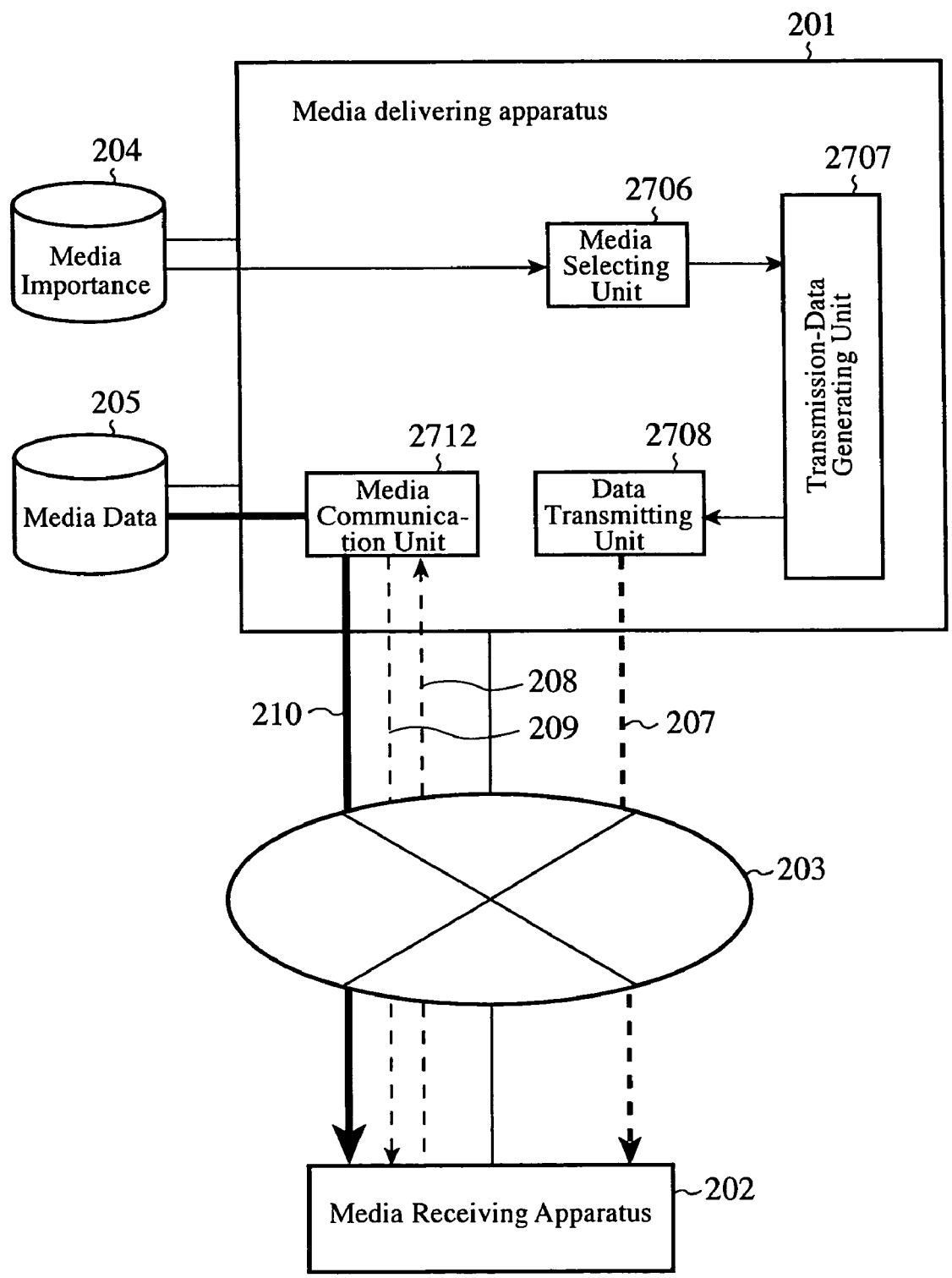
FIG. 3 is a block diagram showing the internal structure of the media delivering apparatus in accordance with embodiment 1 of the present invention.

FIG. 3 is a block diagram showing the internal structure of the media delivering apparatus 201. The media delivering apparatus 201 is provided with a media selecting unit 2706, a transmission-data generating unit 2707, a data transmitting unit 2708, and a media communication unit 2712, and can access the degree of media importance 204 assigned to any media data 205 and any media data 205.

Next, the operation of the media delivering apparatus shown in FIG. 3 will be explained.

The media selecting unit 2706 of the media delivering apparatus 201 refers to the degree of media importance 204 assigned to each media data, and selects media data 205 to be delivered by setting the degree of media importance 204 referred as a parameter. The transmission-data generating unit 2707 creates metadata 206 in which both address information indicating a location of each media data 205 selected by the media selecting unit 2706, and presentation layout information indicating a layout of the selected media data on the screen of the media receiving apparatus 202, which is determined based on the degree of media importance 204 assigned to each selected media data 205 are described, and the data transmitting unit 2708 carries out a delivery 207 of the metadata 206 which is created by the transmission-data generating unit to the media receiving apparatus 202.

The media receiving apparatus 202 receives the metadata 206 delivered thereto, and issues a request 208 for delivery of the media data 205 based on the address information described in the metadata 206. The media communication unit 2712 of the media delivering apparatus 201 sends a request response 209 to the media receiving apparatus 202 in response to the request 208, and carries out a delivery 210 of the requested media data 205 to the media receiving apparatus. The media receiving apparatus 202 then receives the media data 205 delivered thereto, and provides a synchronous presentation of the media data based on the presentation layout information which is described in the metadata 206.

Figure 4:
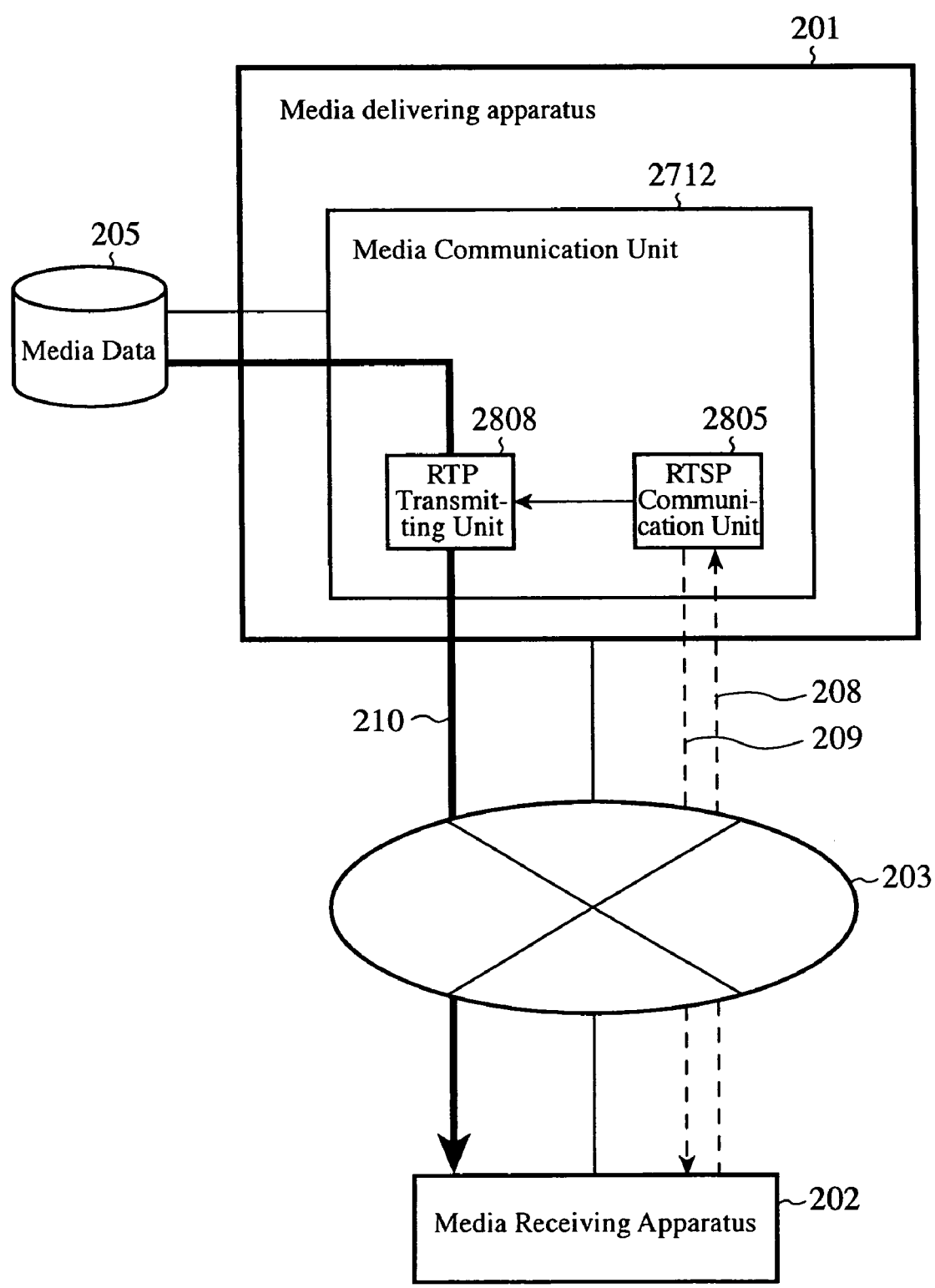
FIG. 4 is a block diagram showing the internal structure of a media communication unit in the media delivering apparatus in accordance with embodiment 1 of the present invention.

FIG. 4 is a block diagram showing the internal structure of the media communication unit 2712 of the media delivering apparatus 201. The media communication unit 2712 is provided with an RTSP communication unit 2805 and an RTP transmitting unit 2808.

Next, the operation of the media communication unit shown in FIG. 4 will be explained.

In response to the request 208 for delivery of the media data 205, which the media receiving apparatus 202 has transmitted to the media delivering apparatus, the RTSP communication unit 2805 sends the request response 209 to the media receiving apparatus 202 according to RTSP, and instructs the RTP transmitting unit 2808 to deliver the requested media data 205 to the media receiving apparatus. The RTP transmitting unit 2808 then carries out a delivery 210 of the media data 205 according to the command from the RTSP communication unit 2805.

Figure 5:
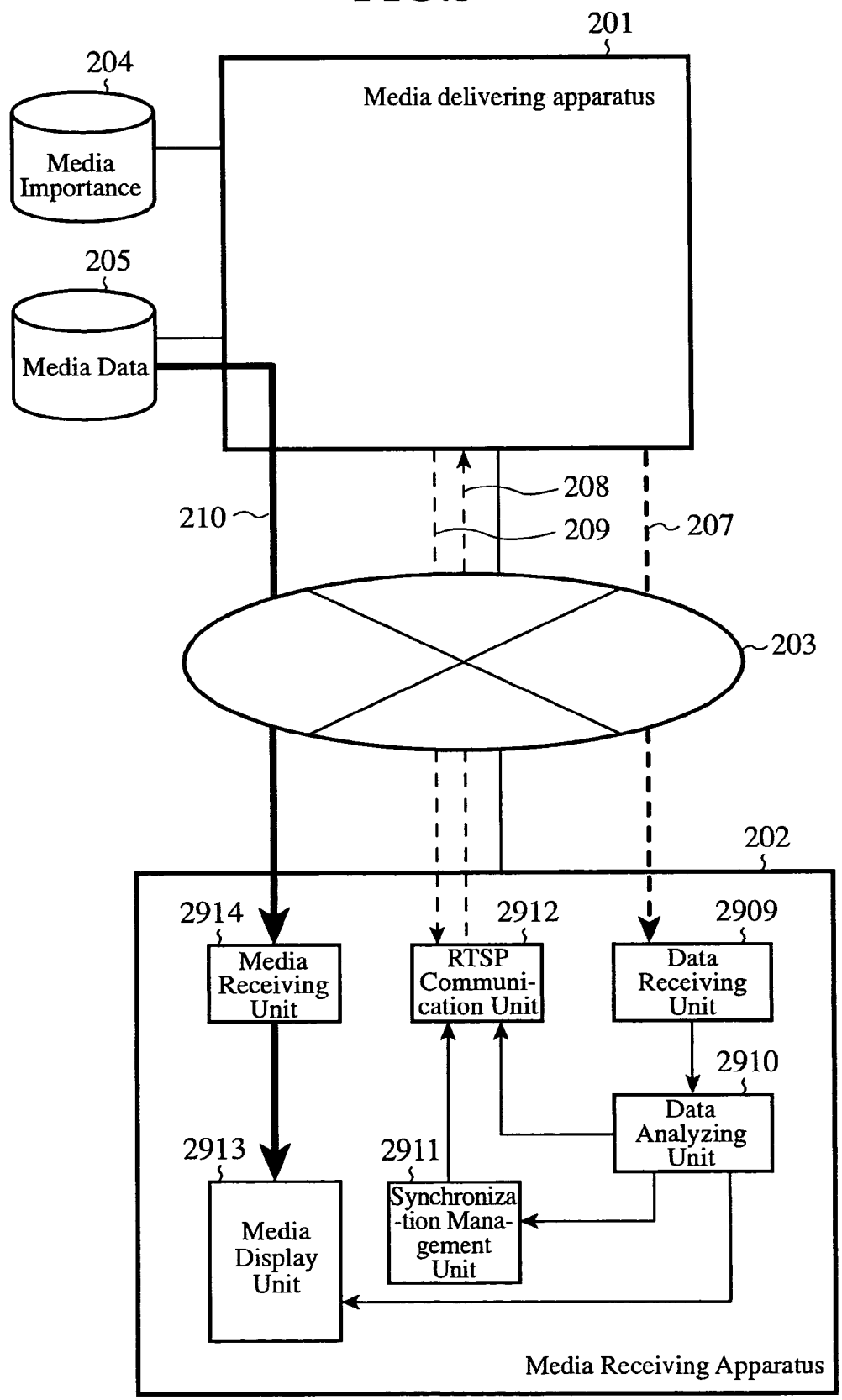
FIG. 5 is a block diagram showing the internal structure of a media receiving apparatus in accordance with embodiment 1 of the present invention.

FIG. 5 is a block diagram showing the internal structure of the media receiving apparatus 202. The media receiving apparatus 202 is provided with a data receiving unit 2909, a data analyzing unit 2910, a synchronous management unit 2911, an RTSP communication unit 2912, a media display unit 2913, and a media receiving unit 2914.

Next, the operation of the media receiving apparatus shown in FIG. 5 will be explained.

The data receiving unit 2909 of the media receiving apparatus 202 receives the metadata 206 delivered from the media delivering apparatus 201, and delivers it to the data analyzing unit 2910. Address information indicating the location of each media data 205, and presentation layout information indicating a layout of the media data on the screen are described in the metadata 206, and synchronization information indicating a timing for switching among screen displays when needed can be included in the metadata 206. The data analyzing unit 2910 analyzes the metadata 206 received by the data receiving unit 2909, notifies the address information indicating the location of each media data 205, which is described in the metadata 206, to the RTSP communication unit 2912, and, when the synchronization information is included in the metadata 206, creates a list of timings at which the media receiving apparatus issues a request for delivery of the media data 205, notifies it to the synchronous management unit 2911, and notifies the presentation layout information about the media data 205 which is described in the metadata 206 to the media display unit 2913. When the synchronization information is not included in the metadata 206, the data analyzing unit 2910 creates a list of request timings at which the media receiving apparatus issues a request for delivery of the media data at the time of start of presentation, and notifies it to the synchronous management unit 2911.

The synchronous management unit 2911 provides a request timing to the RTSP communication unit 2912 based on the list of request timings notified from the data analyzing unit 2910. The RTSP communication unit 2912 issues a request 208 for delivery of the media data 205 at the request timing provided from the synchronous management unit 2911 based on the address information notified from the data analyzing unit 2910.

When receiving this request 208 from the media receiving apparatus 202, the media delivering apparatus 201 sends a request response 209 to the media receiving apparatus 202, and carries out a delivery 210 of the requested media data 205 to the media receiving apparatus. The media receiving unit 2914 of the media receiving apparatus 202 receives the media data 205 delivered thereto, and delivers the media data to the media display unit 2913. The media display unit 2913 receives the media data 205 from the media receiving unit

2914, and provides a synchronous presentation of the media data based on the presentation layout information notified from the data analyzing unit 2910.

As a concrete example of the media delivery system shown in FIG. 2, a surveillance system will be explained.

For example, in order to deliver media data 205 about each of four surveillance video images using four surveillance video cameras, the media delivering apparatus assigns a degree of media importance 204 to each media data in advance according to the place in which the corresponding surveillance camera is located. In this case, the media delivering apparatus 201 selects media data 205 about a surveillance video image to be delivered by setting the degree of media importance 204 assigned to each media data as a parameter, creates metadata 206 in which address information indicating the location of the selected media data 205 and presentation layout information are described, and carries out a delivery 207 of the created metadata 206 to the media receiving apparatus 202.

FIG. 6 is a diagram showing an example of the presentation layout in a case of simultaneously monitoring four points (i.e., points A to D). In a case of a list of degrees of importance 706, a presentation layout in which a video image 702 of point A, a video image 703 of point B, a video image 704 of point C, and a video image 705 of point D are displayed is formed on the entire screen 701 of the media receiving apparatus 202. In contrast, in a case of a list of degrees of importance 708, a presentation layout in which only the video image 702 of point A is displayed is formed on the entire screen.

The media delivering apparatus 201 refers to the degree of media importance 204 assigned to each media data, sets a certain degree of media importance 204 as a threshold, and selects media data 205 to be delivered dynamically. For example, when delivering media data 205 about one or more surveillance points whose degree of media importance 204 is equal to or greater than "medium degree of importance", the media delivering apparatus 201 dynamically creates metadata 206 which indicates a simultaneous delivery of all the media data 205 about the video images 702 to 705 of points A to D in a case of the list of degrees of importance 706. On the other hand, the media delivering apparatus 201 dynamically creates metadata 206 which indicates a delivery of only the media data 205 about the video image 702 of point A in a case of the list of degrees of importance 708. Thus, based on the degree of media importance 204 which is assigned to each media data at the time when the user of the media receiving apparatus 202 makes a request of the media delivering apparatus 201 for delivery of media data 205, the media delivering apparatus 201 creates metadata 206 dynamically.

FIG. 7 is a diagram showing an example of the metadata 206, and this metadata 1301 is used for delivering media data 205 about video images to be displayed on the entire screen 701 of FIG. 6. In this case, although the metadata is written in a multimedia synchronous description language SMIL, the description language for use with the present invention is not limited to SMIL. In the metadata 1301 of FIG. 7, an smil tag 1302 shows that up to a text closed by </smil> is SMIL data. A head tag 1303 shows that up to a text closed by </head> is a header portion. A layout tag 1304 shows that up to a text closed by </layout> is a description about the presentation layout information. A root-layout tag 1305 shows the size of the entire screen, and width shows the horizontal width of the screen and height shows the vertical width of the screen. A region tag 1306 is a tag which defines a region in the screen, id shows id for identification of the region, left shows an offset value in a horizontal direction, top shows an offset value in a vertical direction, width shows the horizontal width of the region, and height shows the vertical width of the region. A body tag 1307 shows that up to a text closed by </body> is a body portion. A par tag 1308 shows that a simultaneous presentation of media data specified by up to a text closed by </par> is to be provided. A video tag 1309 is a tag which specifies media data 205 to be displayed, region specifies id of the region tag set by the presentation layout information and shows that the media data is to be presented in the region, and src shows the address information indicating the location of the media data 205.

The media receiving apparatus 202 receives the metadata 1301 of FIG. 7, and issues a request 208 for delivery of the media data 205 based on the address information described in the metadata. When receiving the request 208 from the media receiving apparatus, the media delivering apparatus 201 carries out a delivery 210 of the media data 205 to the media receiving apparatus 202. The media receiving apparatus 202 receives the media data 205 delivered thereto and carries out synchronous presentation of the media data so that they can have a presentation layout on the entire screen 701 as shown in FIG. 6, which is described by the metadata 1301.

Although FIG. 6 shows an example of monitoring four points, as an example of surveillance application, there can be provided an application example of, when monitoring two or more sections, for example, two or more buildings, the above-mentioned four points belonging to the same section, creating metadata 206 dynamically based on the degree of media importance 204 assigned to each media data about the section when triggered by a request for delivery of video images captured for the section which is issued by the user of the media receiving apparatus 202, and delivering the metadata to the media receiving apparatus 202 by means of the media delivering apparatus 201. In the case of such a surveillance application example, the media receiving apparatus 202 can allow the user to select a section for which it makes a request for delivery of video images, and the media delivering apparatus 201 creates metadata 206 based on the degree of media importance 204 which is effective only in the section selected by the user.

When the media delivering apparatus 201 creates metadata 206 dynamically, the media receiving apparatus 202 can selectively present only media data 205 which is important at that time by only issuing a request 208 for delivery of the media data based on the metadata 206. In other words, the media receiving apparatus 202 simply presents the media data 205 according to the metadata 206. According to this structure, if the media receiving apparatus 202 can interpret the metadata 206 so as to issue a request 208 for delivery of the media data, the media receiving apparatus 202 can receive the media data 205 at a correct timing even though the media receiving apparatus 202 is of whatever type. In addition, if the media receiving apparatus 202 has a decoder for decoding the media data 205, the media receiving apparatus 202 can provide a synchronous presentation of the media data 205 based on the metadata 206 even though the media receiving apparatus 202 is of whatever type. However, when there is a large amount of media data 205 to be delivered, there is a possibility that the media receiving apparatus 202 becomes overloaded depending upon the communication capability of the network 203 and the receiving capability of the media receiving apparatus 202, and presentation of media data is performed correctly. Next, the media delivery system which is so constructed as to prevent the media receiving apparatus from becoming overloaded will be explained.

Figure 8:
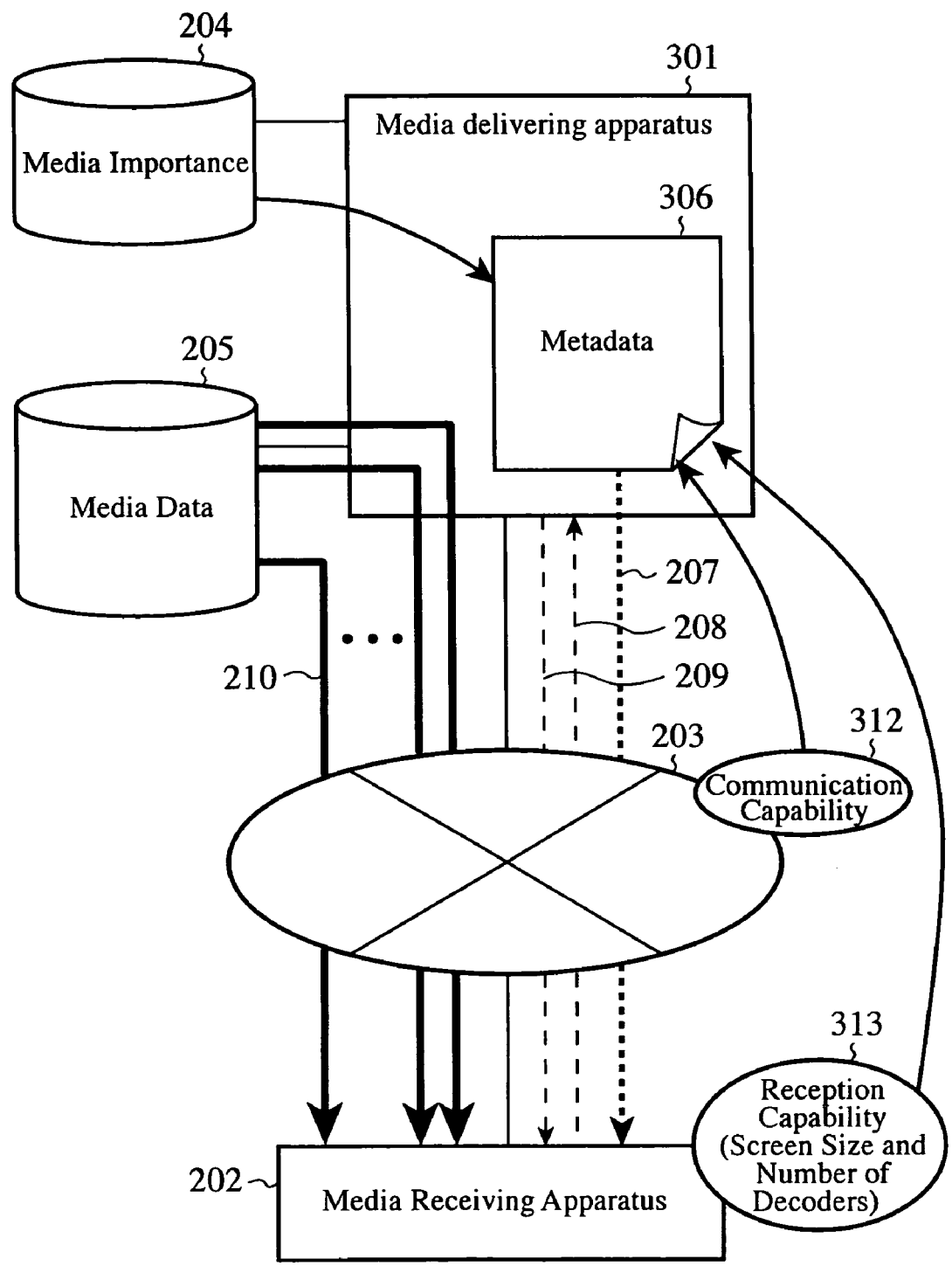
FIG. 8 is a diagram explaining the media delivery system which uses the metadata in accordance with embodiment 1 of the present invention.

FIG. 8 is a diagram explaining a media delivery system which uses metadata in accordance with a variant of embodiment 1 of the present invention. In FIG. 8, a media delivering apparatus 301 is connected to a media receiving apparatus 202 by way of a network 203, and can access the degree of media importance 204 assigned to any media data 205 and any media data 205.

Next, the operation of the media delivery system shown in FIG. 8 will be explained.

There is one or more media data 205 in the system, and a degree of media importance 204 is assigned to each media data 205. Each media data 205 has an address which is uniquely discriminable within the system. The number of various parameters for generating metadata 306 automatically in the media delivering apparatus 301 of FIG. 8 is large compared with that of the media delivering apparatus 201 of FIG. 2. To be more specific, when receiving a request for delivery of media data 205 from the media receiving apparatus 202, the media delivering apparatus 301 uses one or more of parameters shown in the following (b) to (d) in addition to a parameter shown in the following (a):

(a) The media importance 204
(b) The communication capability 312 of the network 203 disposed between the media delivering apparatus 301 and the media receiving apparatus 202
(c) The screen size as the receiving capability 313 of the media receiving apparatus 202
(d) The decoding capacity, such as the number of decoders and the encoding rate, as the receiving capability 313 of the media receiving apparatus 202

Thus, by using one or more of the parameters shown in (b) to (d) in addition to the parameter shown in (a), and by taking into consideration not only the degree of media importance 204 but the communication capability 312 of the network 203 and the receiving capability 313 of the media receiving apparatus 202, the media delivering apparatus selects one or more media data 205 to be delivered, creates metadata 306 in which address information about the location of each selected media data 205 and presentation layout information are described, and carries out a delivery 207 of the metadata 306 to the media receiving apparatus 202. The media receiving apparatus 202 receives the metadata 306, and issues a request 208 for delivery of the media data 205 based on the address information described in the metadata. The media delivering apparatus 301 receives the request 208, sends a request response 209 to the media receiving apparatus 202, and carries out a delivery 210 of the media data 205 to the media receiving apparatus. The media receiving apparatus 202 receives the media data 205 delivered thereto, and provides a synchronous presentation of the media data 205 based on the presentation layout information described in the metadata 306.

In the media delivering apparatus 301 of FIG. 8, the selection of media data 205 to be delivered, the number of media data 205 to be delivered at a time, and the quality of the media data 205 to be delivered are based on the parameters shown in the above-mentioned (a) to (d). To be more specific, the higher importance media data 205 has, the higher probability it is selected, and the higher communication capability 312 the network 203 has or the higher receiving capability 313 the media receiving apparatus 202 has, the larger number of media data 205 is delivered at a time and the higher quality the media data 205 has.

Figure 9:
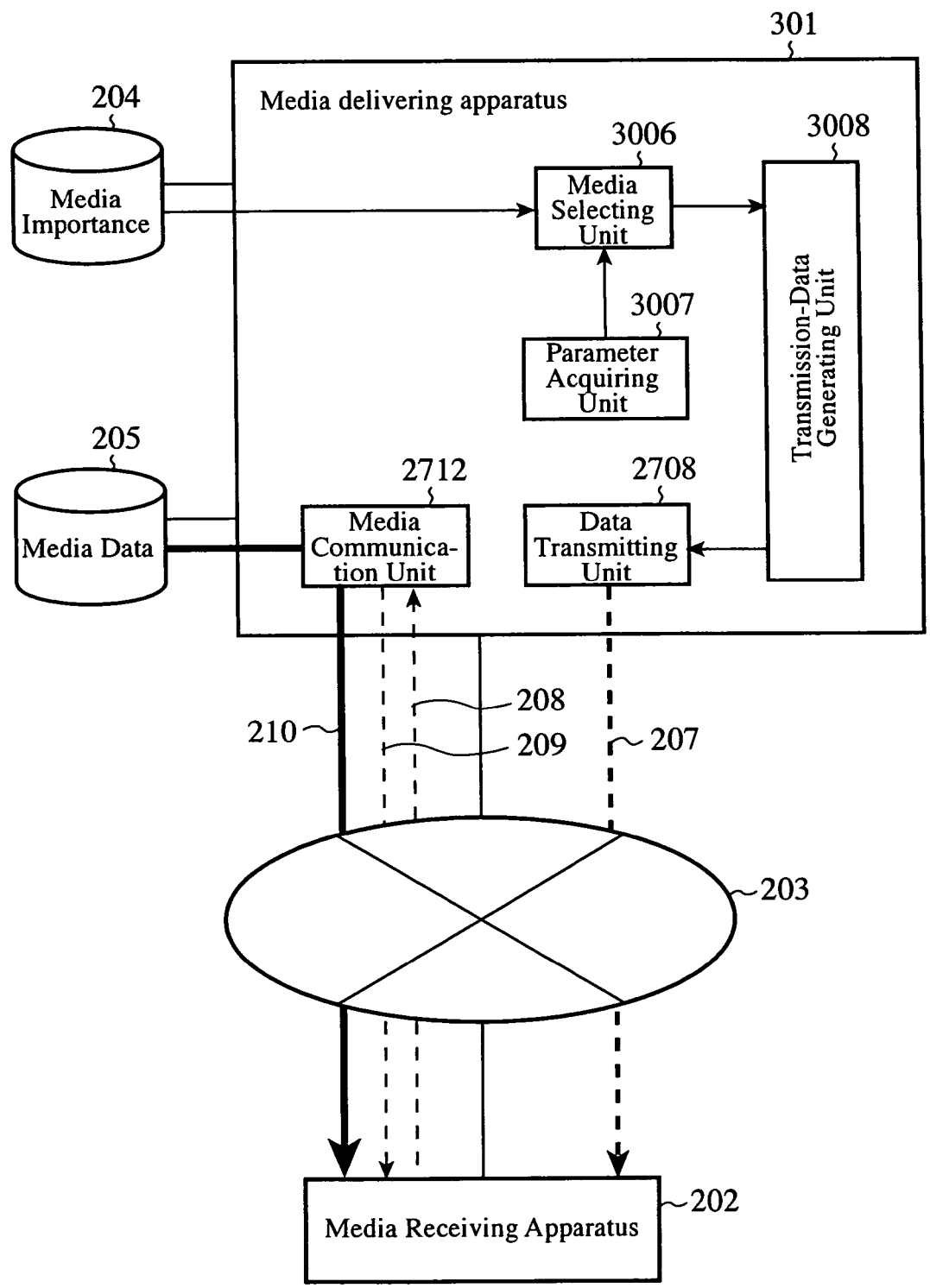
FIG. 9 is a block diagram showing the internal structure of the media delivering apparatus in accordance with embodiment 1 of the present invention.

FIG. 9 is a block diagram showing the internal structure of the media delivering apparatus 301. This media delivering apparatus 301 differs from the media delivering apparatus 201 of FIG. 3 in that it additionally has a parameter acquiring unit 3007, and includes a media selecting unit 3006 instead of the media selecting unit 2706 and a transmission-data generating unit 3008 instead of the transmission-data generating unit 2707.

Next, the operation of the media delivering apparatus shown in FIG. 9 will be explained.

The parameter acquiring unit 3007 acquires the parameters shown in the above-mentioned (b) to (d), i.e., at least one of the communication capability 312 of the network 203 and the receiving capability 313 of the media receiving apparatus 202 using a certain means, and notifies the acquired parameter to the media selecting unit 3006. Although as this means for acquiring parameters, a communicating means for carrying out communications to exchange the communication capability or receiving capability with the media receiving apparatus 202 in advance, for example, can be provided, the means for acquiring parameters of the present invention is not limited to the communicating means.

The media selecting unit 3006 determines media data 205 to be delivered based on both the degree of media importance 204 and at least one of the communication capability 312 of the network 203 and the receiving capability 313 of the media receiving apparatus 202. The transmission-data generating unit 3008 creates metadata 306 in which both address information indicating the location of each media data 205 selected by the media selecting unit 3006, and presentation layout information indicating a layout of the selected media data on the screen of the media receiving apparatus 202, which is determined based on both the degree of media importance 204 assigned to the selected media data 205, and at least one of the communication capability 312 of the network 203 and the receiving capability 313 of the media receiving apparatus 202 are described. The other operation of the media delivering apparatus is the same as that of the media delivering apparatus 201 of FIG. 3.

A surveillance system will be explained as a concrete example of the media delivery system shown in FIG. 8. An explanation will be given for a case in which the media delivering apparatus delivers media data to the media receiving apparatus 202 having a high receiving capability by way of the network 203 having a high communication capability by using, for example, all the parameters shown in the above-mentioned (a) to (d) in the case of FIG. 8. In this example, it is assumed that the network 203 has a communication band of 1.5 Mbps, and the media receiving apparatus 202 has a resolution of XGA (1024×768) and a decoding capability of decoding media data 205 about ten video images simultaneously.

Figure 10:
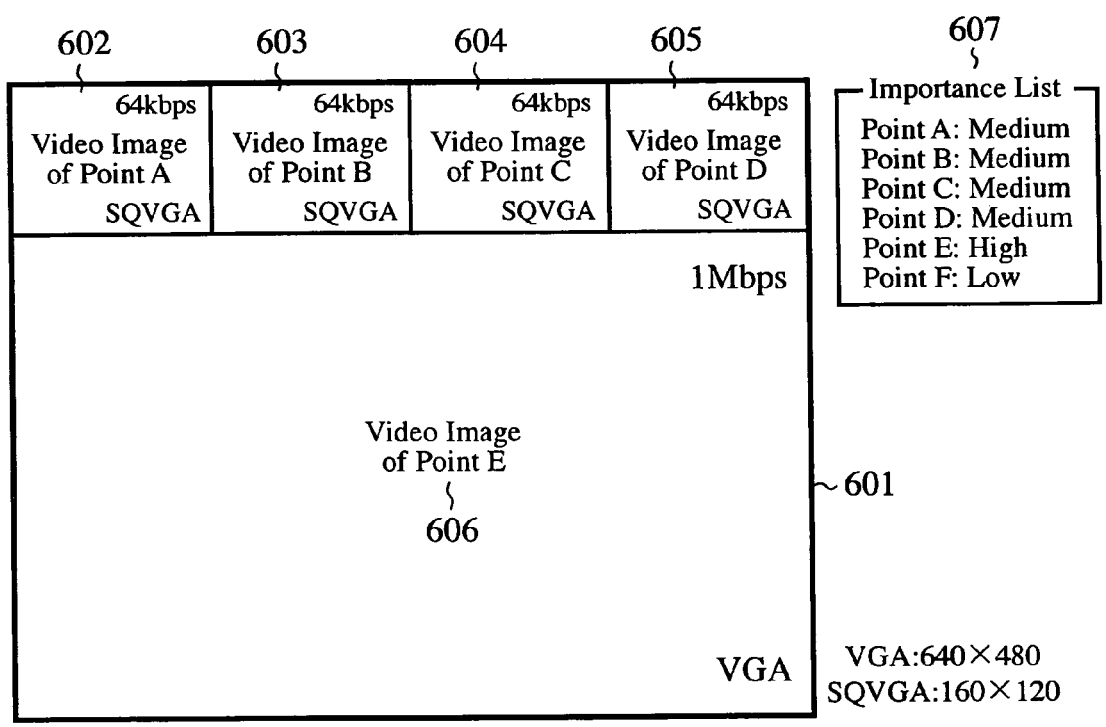
FIG. 10 is a diagram showing an example of a presentation layout in a case of simultaneously monitoring six points in accordance with embodiment 1 of the present invention.

FIG. 10 is a diagram showing an example of the presentation layout in a case of simultaneously monitoring six points (e.g., points A to F). Based on a list of degrees of importance 607, a presentation layout in which a video image 602 of point A, a video image 603 of point B, a video image 604 of point C, a video image 605 of point D, and a video image 606 of point E are displayed is formed on the entire screen 601 of the media receiving apparatus. As shown in the list of degrees of importance 607, in the presentation layout on the entire screen 601, the video image of point E is a surveillance video image having a "high degree" of media importance, and the video images of points A to D are surveillance video images having a "medium degree" of media importance. Since the media receiving apparatus 202 has a sufficiently large screen size and a high decoding capability, the media receiving apparatus 202 sets the threshold for media importance to be "medium" and performs monitoring of the five points except the point F having a "low degree" of media importance by displaying high-quality video images because the network 203 has a high communication capability, while the media receiving apparatus performs monitoring of the point E having a "high degree" of media importance by displaying a high-quality high-resolution (1 Mbps and VGA resolution)

video image of the point E, so that the media receiving apparatus forms a presentation layout in which a thumbnail display (64 k bps and SQVGA resolution) of the points A to D is produced, where VGA resolution is 640×480, and SQVGA resolution is 16×120. The media receiving apparatus thus carries out simultaneous presentation of the five video images.

In such a case, the media delivering apparatus 301 creates metadata 306 used for delivery of surveillance video images, which will generate a presentation layout as shown in FIG. 10, and delivers the metadata to the media receiving apparatus 202.

FIG. 11 is a diagram showing an example of the metadata 306 which is used for delivering the media data 205 about video images to be displayed on the entire screen 601 of FIG. 10. Each tag included in the metadata 1201 of FIG. 11 has the same meaning as a corresponding tag included in the metadata 1301 which is already explained with reference to FIG. 7.

The media receiving apparatus 202 receives the metadata 1201 as shown in FIG. 11, and issues a request 208 for delivery of the media data 205 based on the address information described in the metadata. The media delivering apparatus 301 receives the request 208, and performs a delivery 210 of the media data 205 to the media receiving apparatus 202. The media receiving apparatus 202 receives the media data 205 delivered thereto, and provides a synchronous presentation of the received media data in the form of the presentation layout shown in FIG. 10 based on the presentation layout information described in the metadata 1201 as shown in FIG. 11.

On the other hand, also in the case of monitoring six points based on the same list of degrees of importance 607 of FIG. 10, the media delivering apparatus 301 creates metadata 306 which differs from the metadata 1201 of FIG. 11 if the communication capability 312 of the network 203 is low, for example, if the transmission rate is 32 bps. When the communication capability 312 of the network 203 is low, the media delivering apparatus 301 sets the threshold for media importance 204 to be "high" instead of "medium", and restricts the number of media data 205 which are to be delivered to the media receiving apparatus first. In the example of the importance list 607 of FIG. 10, when the threshold for media importance is set to be "high", the number of media data which are to be delivered to the media receiving apparatus is restricted to one, i.e., only the video data about the point E is delivered to the media receiving apparatus. After doing so, the media delivering apparatus 301 creates dynamically metadata 306 used for delivering the video data of 32 k bps about the point E to the media receiving apparatus 202, and then performs a delivery 207 of the video data to the media receiving apparatus.

Next, a case in which all the parameters shown in abovementioned (a) to (d) are used, and the communication capability 312 of the network 203 and the receiving capability 313 of the media receiving apparatus 202 are all low in the example of FIG. 8 will be explained. In this example, it is assumed that the network 203 has a low communication capability 312 which is of order of 32 kbps, and a resolution SQVGA (160×120), and the media receiving apparatus 202 has, as the receiving capability 313, a low decoding capability of decoding only one video data at a time. In such a case, the media delivering apparatus 301 creates metadata 1401 as shown in FIG. 13, and performs a delivery 207 of the metadata to the media receiving apparatus 202 in order to carry out delivery of video images as shown in FIG. 12.

Figure 12:
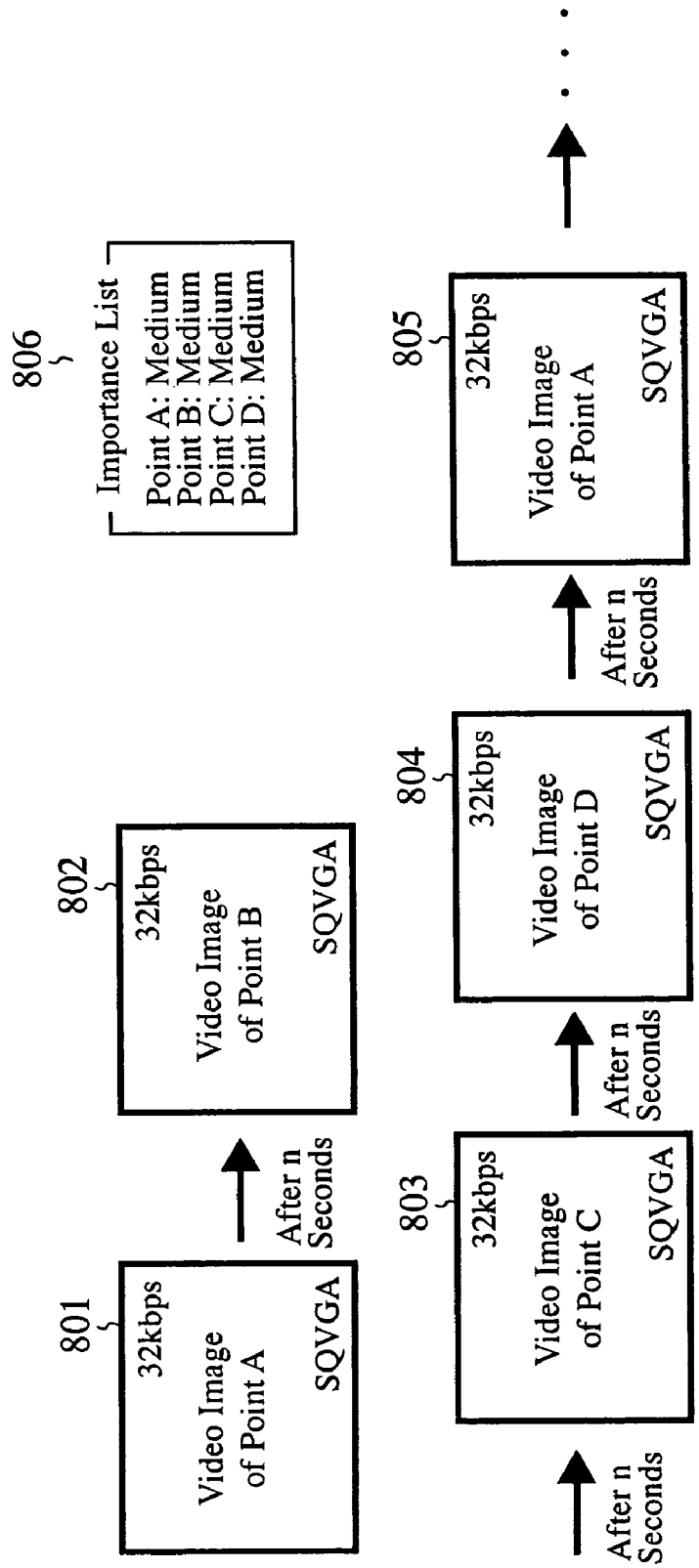
FIG. 12 is a diagram showing an example of a presentation layout in a case of simultaneously monitoring four points in accordance with embodiment 1 of the present invention.

FIG. 12 is a diagram showing an example of the presentation layout in the case of monitoring four points (e.g., points A to D). In this example, a video image 801 of point A, a video image 802 of point B, a video image 803 of point C, a video image 804 of point D, and a video image 805 of point A are transmitted one by one to the media receiving apparatus and are presented one by one by the media receiving apparatus based on a list of degrees of importance 806.

In the example shown in FIG. 12, since there is no difference among the degrees of media importance 204 assigned to the plurality of surveillance points, as shown in the importance list 806, and the media receiving apparatus 202 has a small screen size and a low decoding capability, the media receiving apparatus 202 presents only a video image of one point at a time. In addition, since the communication capability 312 of the network 203 is low, the media delivering apparatus monitors each surveillance point to create a video image of the point at a lower bit rate. Therefore, since there is no difference among the degrees of media importance 204 respectively assigned to the four surveillance points, the media delivering apparatus sequentially switches among the video images of the four points in such a manner as A->B->C->D->A-> . . . at predetermined intervals. The media delivering apparatus 301 thus creates metadata 306 for implementing such a presentation layout based on the low resolution of the media receiving apparatus 202, and performs a delivery 207 of the metadata to the media receiving apparatus 202.

FIG. 13 is a diagram showing an example of the metadata 306, and shows an example for implementing a presentation layout as shown in FIG. 12. In the metadata 1401, an seq tag 1402 shows that media data 205 specified by a text closed by </seq> are presented in order, and repeat= "indefinite" shows that the presentation of the media data is repeated an infinite number of times. A video tag 1403 is a tag which defines media data 205, region specifies id of a region tag set by the presentation layout information and shows that the media data is to be presented in the region, src shows the address information indicating the location of the media data 205, and dur shows a presentation time.

In FIG. 8, the media receiving apparatus 202 receives the metadata 1401 as shown in FIG. 13, and issues a request 208 for delivery of the media data 205 based on the address information described in the metadata. The media delivering apparatus 301 receives the request 208, and performs a delivery 210 of the media data 205 to the media receiving apparatus 202. The media receiving apparatus 202 receives the media data 205 delivered thereto, and presents the media data in the form of the presentation layout of FIG. 12 which is described in the metadata 1401. The timing at which the media receiving apparatus switches among the corresponding video images is described in dur of the video tag 1403 included in the metadata 1401 of FIG. 13. The example of the metadata 1401 of FIG. 13 is equivalent to a case where n is set to 30 seconds in FIG. 12. The media receiving apparatus 202 issues a request 208 for delivery of the media data 205 at the timing at which it switches among the video images based on the address information described in the metadata 1401, and switches among the presented images one by one.

In the example of FIG. 8, when all the parameters shown in above-mentioned (a) to (d) are used, the communication capability 312 of the network 203 and the receiving capability 313 of the media receiving apparatus 202 are all low, and there is a difference among the degrees of importance respectively assigned to the surveillance points, the media delivering apparatus 301 creates metadata 1601 as shown in FIG. 15 in order to carry out a delivery of video images as shown in FIG. 14, for example, and performs a delivery 207 of the metadata to the media receiving apparatus 202.

FIG. 14 is a diagram showing an example of the presentation layout in the case of monitoring three points (e.g., points A to C). In this example, a video image 901 of point B, a video image 902 of point C, a video image 903 of point A, and a video image 904 of point B are transmitted one by one to the media receiving apparatus and are presented one by one by the media receiving apparatus based on a list of degrees of importance 905.

In the example shown in FIG. 14, since the degree of media importance 204 of the video image of the point B is "high", and the degree of media importance 204 of the video image of each of the points A and B is "medium", as shown in the importance list 905, and the media receiving apparatus 202 has a small screen size and a low decoding capability, the media receiving apparatus presents only a video image of one point at a time. In addition, since the communication capability 312 of the network 203 is low, the media delivering apparatus monitors each surveillance point to create a video image of the point at a lower bit rate. Therefore, since the above-mentioned example is the case where the three points including the point B having a high degree of media importance 204 are monitored, the media delivering apparatus sets the presentation time of the video image of the point B to be longer than that of the video images of the points A and C, and sequentially switches among the video images of the three points in such a manner as B->C->A->B-> . . . , FIG. 15 is a diagram showing an example of the metadata 306, and shows an example for implementing the presentation layout of FIG. 14. Each tag included in this metadata 1601 is the same as a corresponding tag of each above-mentioned metadata.

In FIG. 8, the media receiving apparatus 202 receives the metadata 1601 as shown in FIG. 15, and issues a request 208 for delivery of the media data 205 based on the address information described in the metadata. The media delivering apparatus 301 receives the request 208, and carries out a delivery 210 of the media data 205 to the media receiving apparatus 202. The media receiving apparatus 202 receives the media data 205 delivered thereto, and presents the media data in the form of the presentation layout shown in FIG. 14 which is described in the metadata 1601. The timing at which the media receiving apparatus switches among the corresponding video images is described in the metadata 1601 of FIG. 15. This example of the metadata 1601 is equivalent to a case where m is set to 60 seconds and n is set to 30 seconds in FIG. 14. The media receiving apparatus 202 issues a request 208 for delivery of the media data 205 at the timing at which it switches among the video images based on the address information described in the metadata 1601, and switches among the presented images one by one.

The metadata 306 which the media delivering apparatus 301 of FIG. 8 creates can be described in a form including a conditional branch for determining the presentation layout. This conditional branch can describe conditions concerning not only the parameters shown in the above-mentioned (b) to (d), but also other parameters. The media receiving apparatus 202 analyzes the metadata 306 in which a conditional branch is described and which is delivered from the media delivering apparatus 301 so as to judge conditions in the conditional branch, selects media data 205 to be received and a presentation layout based on results of the judgment, and issues a request 208 for delivery of the selected media data 205 based on address information about the location of the media data 205 to be received. The media delivering apparatus 301 then performs a delivery 210 of the media data 205 to the media receiving apparatus 202 in response to the request 208. The media receiving apparatus 202 receives the media data 205 delivered thereto, and presents the media data in the form of the presentation layout which is selected thereby based on the above-mentioned judgment.

FIG. 16 is a diagram showing an example of the metadata 306 in which a conditional branch for determining the presentation layout is included. In the metadata 1501 of FIG. 16, a switch tag 1502 is a tag for causing the media receiving apparatus to sequentially examine conditions placed in tags included in a text closed by </switch> in the order that they appear in the text and to leave a corresponding condition intact, a layout tag 1503 shows that a text closed by </layout> describes a presentation layout, system Bitrate shows requirements on the communication capability 312 of the network 203, and a par tag 1504 shows that the media data 205 specified by a text closed by </par> are to be simultaneously presented.

This metadata 1501 is an example of the metadata 306 which enables the media receiving apparatus 202 to select a presentation layout as shown in FIG. 10 or 12 under the conditions specified by the parameters shown in the above-mentioned (b). To be more specific, under the conditions specified by the parameters shown in the above-mentioned (b), the media receiving apparatus 202 is allowed to selectively issue either a request 208 for delivery of the media data 205 in such a manner that a presentation layout as shown in FIG. 10 is produced when the media receiving apparatus determines that the network 203 has a high communication capability 312, or a request 208 for delivery of the media data 205 in such a manner that a presentation layout as shown in FIG. 12 is produced when the media receiving apparatus determines that the network 203 has a low communication capability 312.

Thus, the media delivering apparatus 301 can deliver the media data 205 to the media receiving apparatus 202 in consideration of the degree of media importance 204 assigned to the media data 205, the communication capability 312 of the network 203, and the receiving capability 313 of the media receiving apparatus 202, by creating metadata 306 based on the parameters shown in above-mentioned (b) to (d).

Next, processing in a case where the degree of media importance 204 is changed while a presentation of media data 205 is provided will be explained. When the degree of media importance 204 is changed, there is a necessity to carry out a process of delivering media data 205 whose degree of media importance 204 has been changed to a higher degree on a priority basis.

Figure 17:
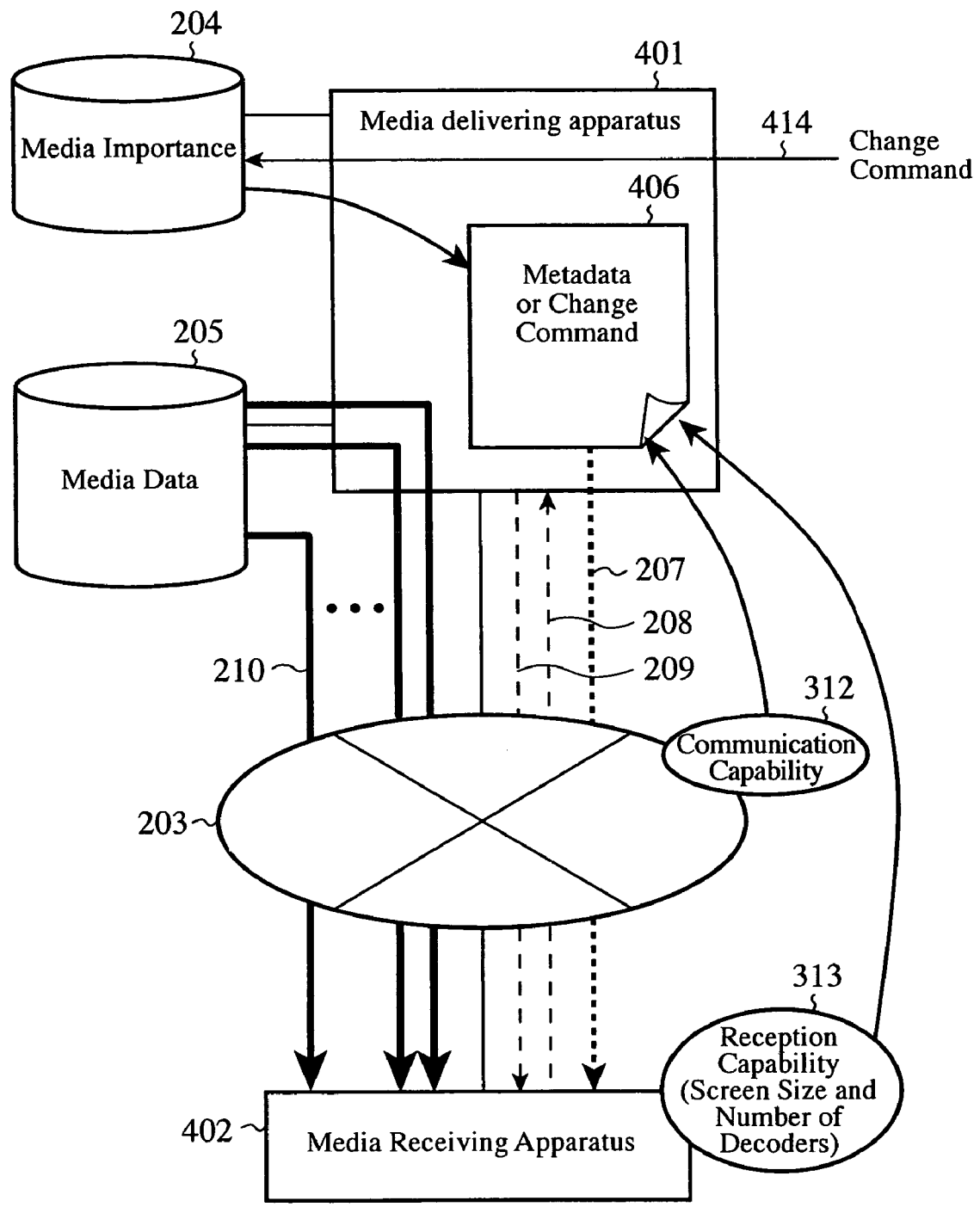
FIG. 17 is a diagram explaining another example of the media delivery systems which uses the metadata in accordance with embodiment 1 of the present invention.

FIG. 17 is a diagram for explaining another variant of the media delivery system which uses metadata in accordance with embodiment 1 of the present invention. In FIG. 17, the media delivering apparatus 401 is connected to the media receiving apparatus 402 by way of the network 203, and can access the degree of media importance 204 assigned to any media data 205 and any media data 205.

Next, the operation of the media delivery system shown in FIG. 17 will be explained.

FIG. 17 shows a case where a change indication 414 is issued for the degree of media importance 204 assigned to media data 205 at a certain time while the media delivery system performs a delivery of media data after carrying out a procedure as shown in FIG. 8. The media delivering apparatus 401 of FIG. 17 differs from the media delivering apparatus 301 of FIG. 8 in that it additionally has a function of changing the degree of media importance 204 assigned to each media data. To be more specific, when changing the degree of media importance 204 assigned to media data, the media delivering apparatus 401 uses a parameter shown in the following (e):

(e) A changed degree of media importance 204

For example, the media delivering apparatus uses one or more of the parameters shown in the above-mentioned (b) to (d), as well as the parameter shown in the above-mentioned (e), selects one or more media data 205 in consideration of not only the changed degree of media importance 204 but also the communication capability 312 of the network 203 and the receiving capability 313 of the media receiving apparatus 202, updates the metadata 306 in which the address information about the selected media data 205 and presentation layout information are described, creates metadata 406, and performs a delivery 207 of the updated metadata 406 to the media receiving apparatus 402.

As compared with the media receiving apparatus 202 of FIG. 8, the media receiving apparatus 402 additionally has a function of analyzing the change command. The details of the change command will be mentioned later. The media receiving apparatus 402 receives the above-mentioned metadata 406, and suspends presentation of the media data 205 currently being presented, and issues a request 208 for delivery of media data 205 based on the address information described in the metadata 406 which it has newly received. The media delivering apparatus 401 receives the request 208, and sends a request response 209 to the media receiving apparatus 402 and then performs a delivery 210 of the media data 205 to the media receiving apparatus. The media receiving apparatus 402 receives the media data 205 delivered thereto, and provides a synchronous presentation of the media data in the form of a presentation layout described in the metadata 406 which it has newly received.

The media delivering apparatus 401 can calculate, as the change command 406, a difference between the metadata 306 which is generated before the degree of media importance 204 is changed and the metadata which is generated after the degree of media importance 204 is changed, instead of the above-mentioned metadata 406, and can perform a delivery 207 of the change command to the media receiving apparatus. In this case, the media receiving apparatus 402 interprets the change command 406 to update the metadata 306 about the media data currently being presented. As a result, the same advantage is provided, as in the case where the whole metadata 406 which is changed as mentioned above is sent to the media receiving apparatus. In general, since the change command 406 has a smaller amount of data than the whole metadata 406, and provides the same advantage, it comes in useful.

For example, reception of alarm information notified from a point under surveillance to the media delivering apparatus 401 is cited as a factor that causes the change indication 414 for changing the degree of media importance 204 assigned to media data. However, this invention is not limited to this specific example from a workable standpoint.

Figure 18:
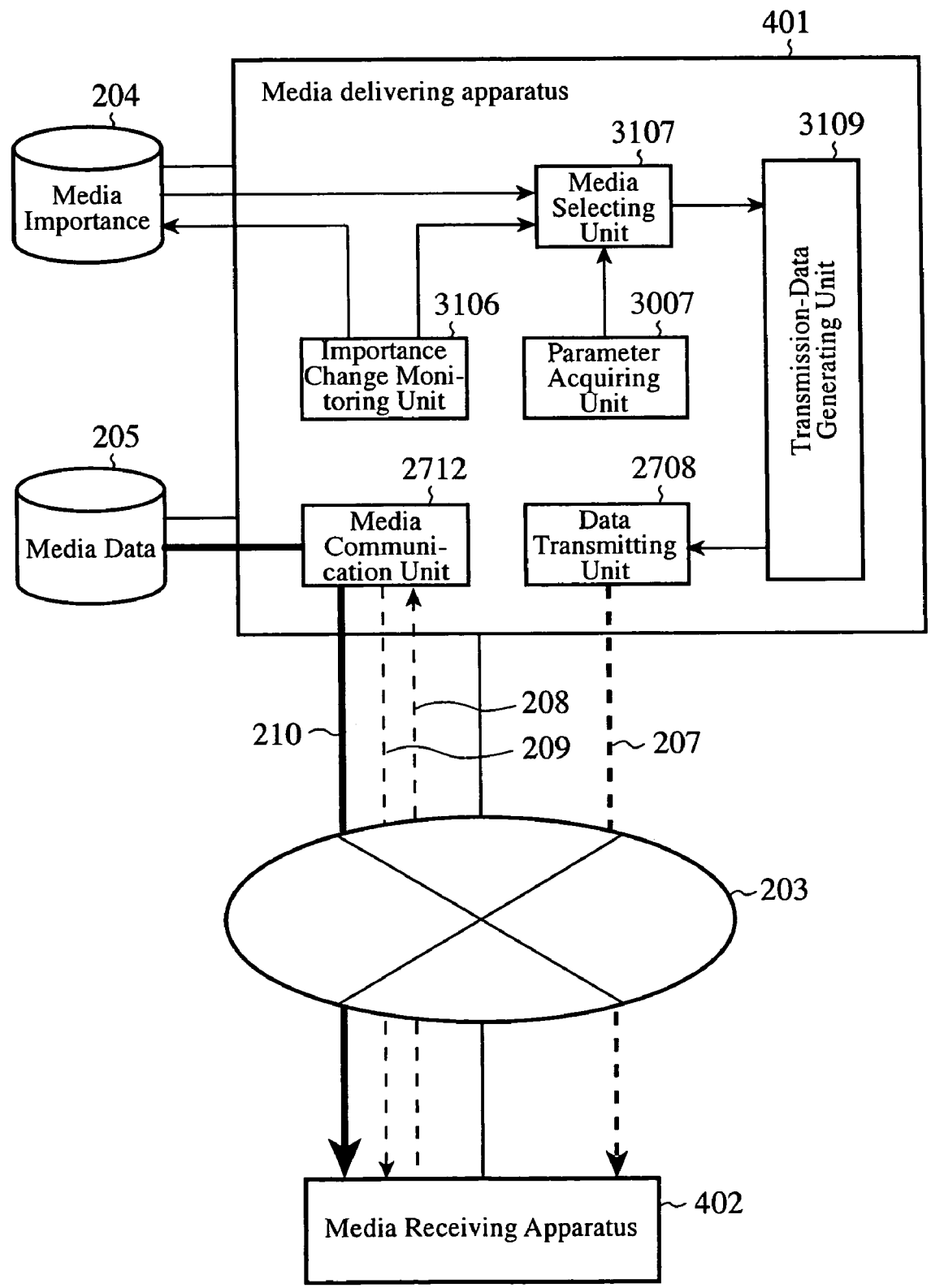
FIG. 18 is a block diagram showing the internal structure of the media delivering apparatus in accordance with embodiment 1 of the present invention.

FIG. 18 is a block diagram showing the internal structure of the media delivering apparatus 401 of FIG. 17. This media delivering apparatus 401 differs from the media delivering apparatus 301 of FIG. 9 in that it additionally has an importance change monitoring unit 3106, and includes a media selecting unit 3107 instead of the media selecting unit 3006 and a transmission-data generating unit 3109 instead of the transmission-data generating unit 3008.

Next, the operation of the media delivering apparatus shown in FIG. 18 will be explained.

The importance change monitoring unit 3106 always monitors whether or not a change indication 414 for changing the degree of media importance 204 assigned to media data is issued, and, when a change command for changing the degree of media importance 204 assigned to media data is issued, changes the degree of media importance 204, and notifies the media selecting unit 3107 that the degree of media importance 204 has been changed. The media selecting unit 3107 receives the notification, selects media data 205 based on both the changed degree of media importance 204 and at least one of the communication capability 312 of the network 203 and the receiving capability 313 of the media receiving apparatus 402, and notifies the selected media data to the transmission-data generating unit 3109.

As compared with the transmission-data generating unit 3008, the transmission-data generating unit 3109 further has a function of creating a change command 406 indicating the difference between the yet-to-be-changed metadata 306 and the changed metadata.

The transmission-data generating unit 3109 creates changed metadata 406 in which both address information indicating the location of each media data 205 selected by the media selecting unit 3107, and presentation layout information indicating a layout of the selected media data on the screen of the media receiving apparatus 402 which is determined based on both the changed degree of media importance 204 and at least one of the communication capability 312 of the network 203 and the receiving capability 313 of the media receiving apparatus 402 are described, or creates a change command 406 indicating a difference between the yet-to-be-changed metadata 306 and the changed metadata based on both the changed degree of media importance 204 and at least one of the communication capability 312 of the network 203 and the receiving capability 313 of the media receiving apparatus 402, and then delivers either the changed metadata or the change command to the data transmitting unit 2708. The details of the change command 406 will be explained later. Other operations of the media delivering apparatus are the same as those of the media delivering apparatus 301 of FIG. 9.

Figure 19:
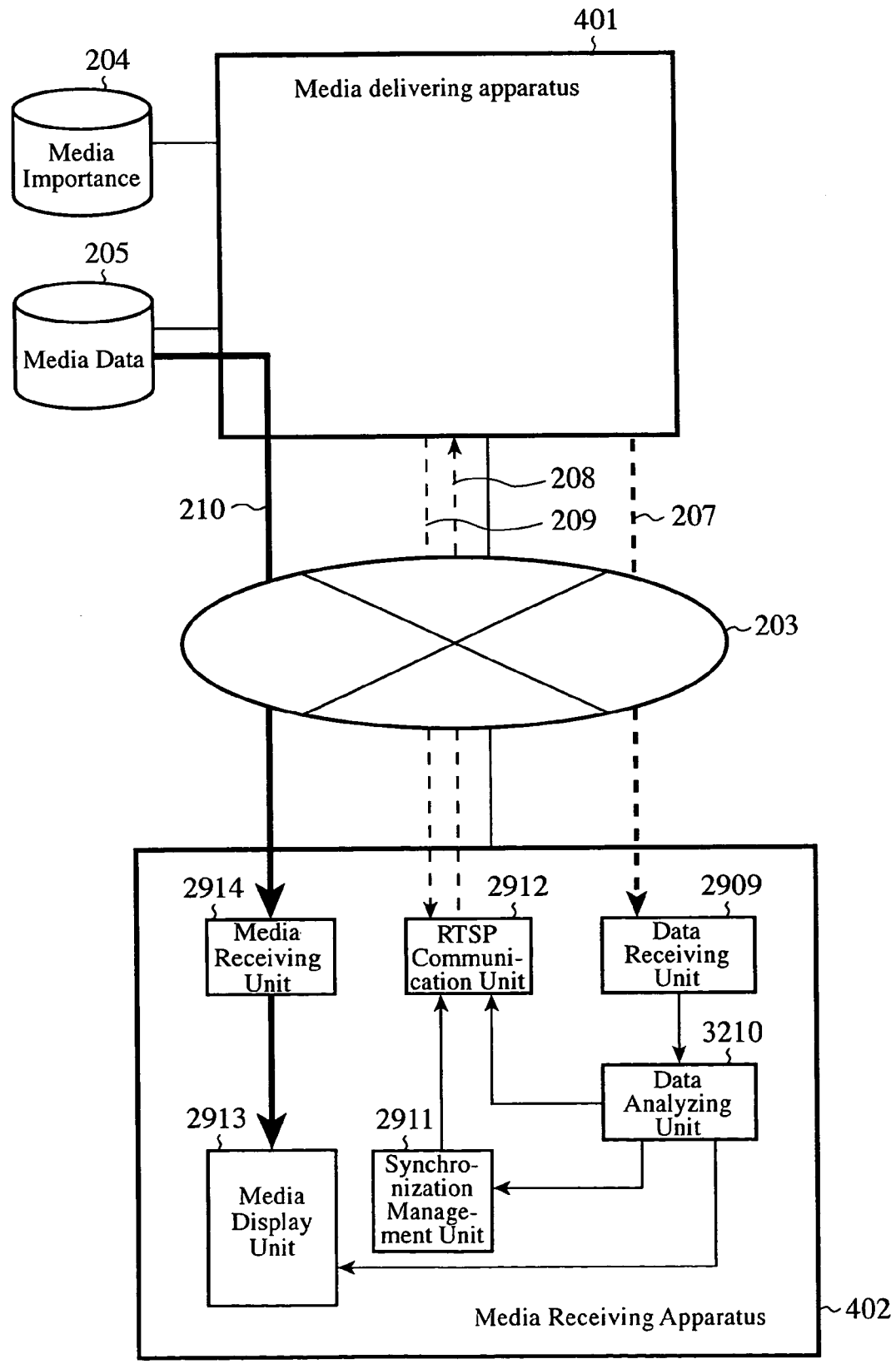
FIG. 19 is a block diagram showing the internal structure of the media receiving apparatus in accordance with embodiment 1 of the present invention.

FIG. 19 is a block diagram showing the internal structure of the media receiving apparatus 402 of FIG. 17. This media receiving apparatus 402 of FIG. 5 differs from the media receiving apparatus 202 of FIG. 5 in that it includes a data analyzing unit 3210 instead of the data analyzing unit 2910.

Next, the operation of the media receiving apparatus shown in FIG. 19 will be explained.

The data analyzing unit 3210 differs from the data analyzing unit 2910 of FIG. 5 in that it interprets not only the metadata 406 but also the change command 406, and additionally has a function of comparing the change command with the metadata 306 which the media receiving apparatus has already received to update the metadata 306. Other operations of the media receiving apparatus are the same as those of the media receiving apparatus 202 of FIG. 5.

A surveillance system will be explained with reference to FIG. 17 as an example of the media delivery system. An explanation will be given for a case in which all the parameters shown in the above-mentioned (a) to (e) are used, and the communication capability 312 of the network 203 and the receiving capability 313 of the media receiving apparatus 202 are all high in the example of FIG. 17.

Figure 20:
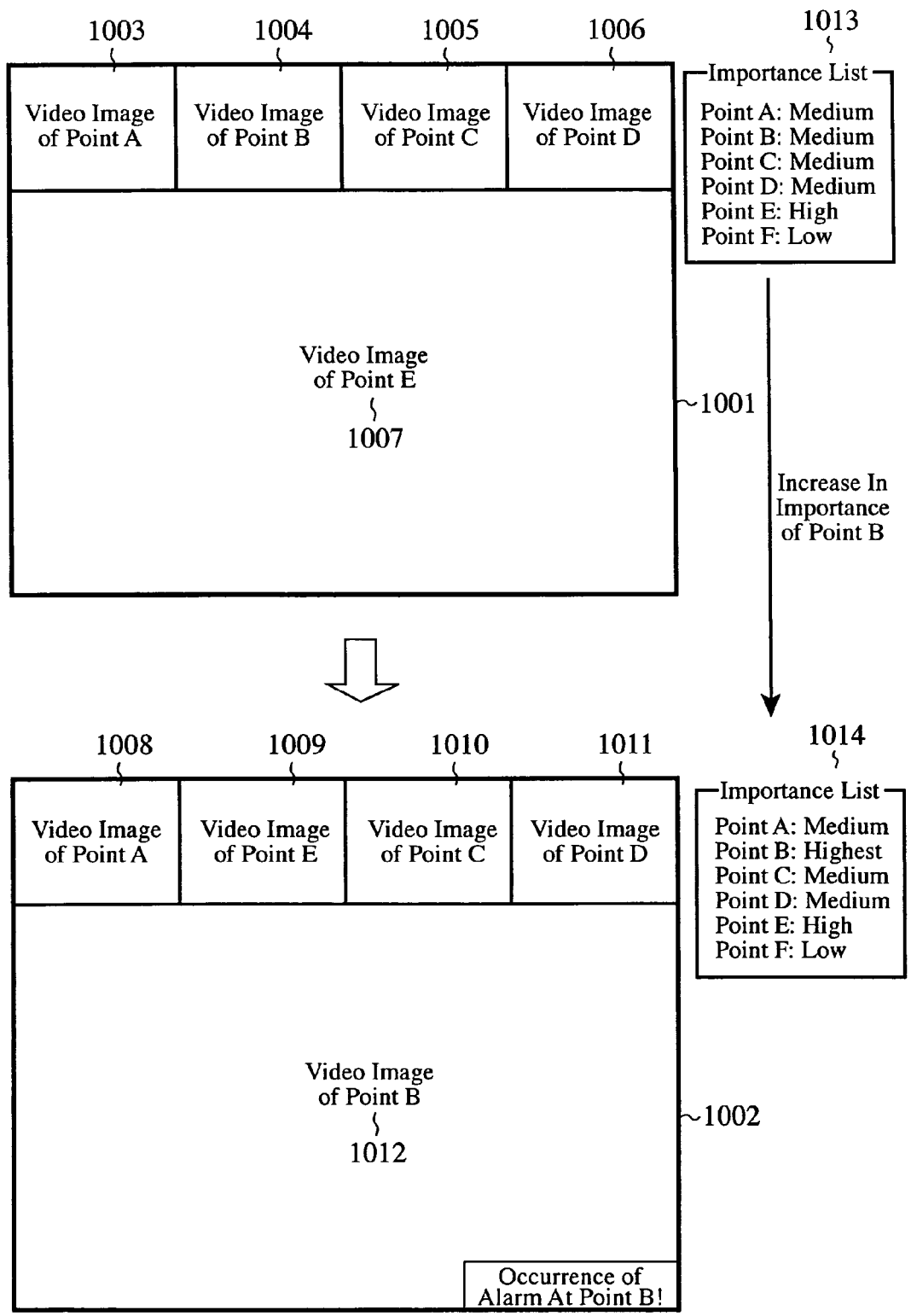
FIG. 20 is a diagram showing an example of transition of the presentation layout when a degree of media importance is changed in a case of simultaneously monitoring six points-in accordance with embodiment 1 of the present invention.

FIG. 20 is a diagram showing an example of switching between presentation layouts in a case where 6 points (e.g., points A to F) are simultaneously monitored and the degree of media importance 204 assigned to media data is changed. In this example, a presentation layout of a video image 1003 of point A, a video image 1004 of point B, a video image 1005 of point C, a video image 1006 of point D, and a video image 1007 of point E which is produced on the whole screen 1001 based on a list of importance degrees 1013 is switched to a presentation layout of a video image 1008 of point A, a video image 1009 of point E, a video image 1010 of point C, a video image 1011 of point D, and a video image 1007 of point B which is produced on the whole screen 1002 based on a changed list of importance degrees 1014. In the presentation layout on the entire screen 1001 based on the yet-to-be-changed importance list 1013, the video image of point E is a surveillance video image having a "high degree" of media importance, and the video images of points A to D are surveillance video images having a "medium degree" of media importance. In the presentation layout on the entire screen 1002 based on the changed importance list 1014, the video image of point B is switched to a surveillance video image having the "highest degree" of media importance because an alarm has been issued from the point B.

Figure 21:
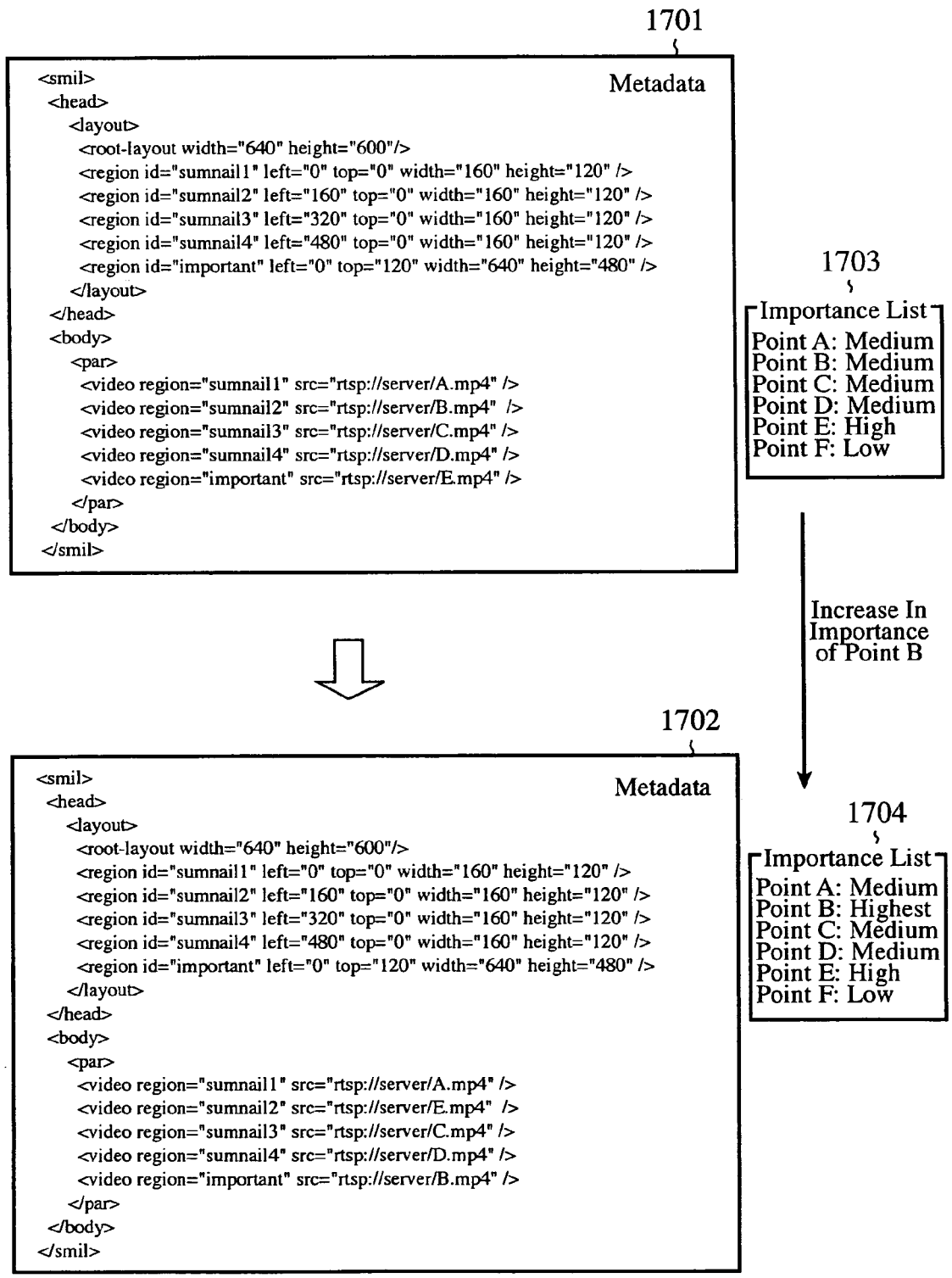
FIG. 21 is a diagram showing an example of change in the metadata when the degree of media importance is changed in accordance with embodiment 1 of the present invention.

FIG. 21 is a diagram showing an example of changing the metadata 204 when the degree of media importance 204 assigned to media data is changed, like FIG. 20. In this example, a case where metadata 1701 based on a list of importance degrees 1703 is changed to metadata 1702 based on a list of importance degrees 1704 because of increase in the importance assigned to the point B is shown.

In a case of assignment of importance as shown in the importance list 1013 of FIG. 20, the media delivering apparatus 401 performs a delivery 207 of metadata 1701 of FIG. 21 used for delivery of video images, which will generate a presentation layout of the video images on the entire screen 1001, to the media receiving apparatus 402. The media receiving apparatus 402 receives the metadata 1701, and then issues a request 208 for delivery of the media data 205 based on the address information described in the metadata. The media delivering apparatus 401 receives the request 208, and performs a delivery 210 of the media data 205 to the media receiving apparatus 402. The media receiving apparatus 402 receives the media data 205 delivered thereto, and provides a synchronous presentation of the media data so that they have a presentation layout as shown in FIG. 20 on the entire screen 1001 based on the presentation layout information described in the metadata 1701.

After that, when the change indication 414 for changing the degree of media importance 204 assigned to media data is issued, the media delivering apparatus 401 changes the importance list to the importance list 1014 of FIG. 20, and then performs a delivery 207 of the metadata 1702 for updating the presentation layout to the media receiving apparatus 402 in order to generate a presentation layout of the media data as shown in FIG. 20 on the entire screen 1002. When receiving the metadata 1702, the media receiving apparatus 402 suspends the presentation of the media data 205 currently being presented, and then issues a request 208 for delivery of the media data 205 based on the address information described in the metadata 1702 which the media receiving apparatus has newly received. The media delivering apparatus 401 receives the request 208, and performs a delivery 210 of the media data 205 to the media receiving apparatus 402. The media receiving apparatus 402 receives the media data 205 delivered thereto, and provides a synchronous presentation of the media data so that they have the presentation layout as shown in FIG. 20 on the entire screen 1002 thereof based on the presentation layout information described in the metadata 1702.

Next, an explanation will be given for a case in which all the parameters shown in above-mentioned (a) to (e) are used, and the communication capability 312 of the network 203 and the receiving capability 313 of the media receiving apparatus 202 are all low in the example of FIG. 17.

Figure 22:
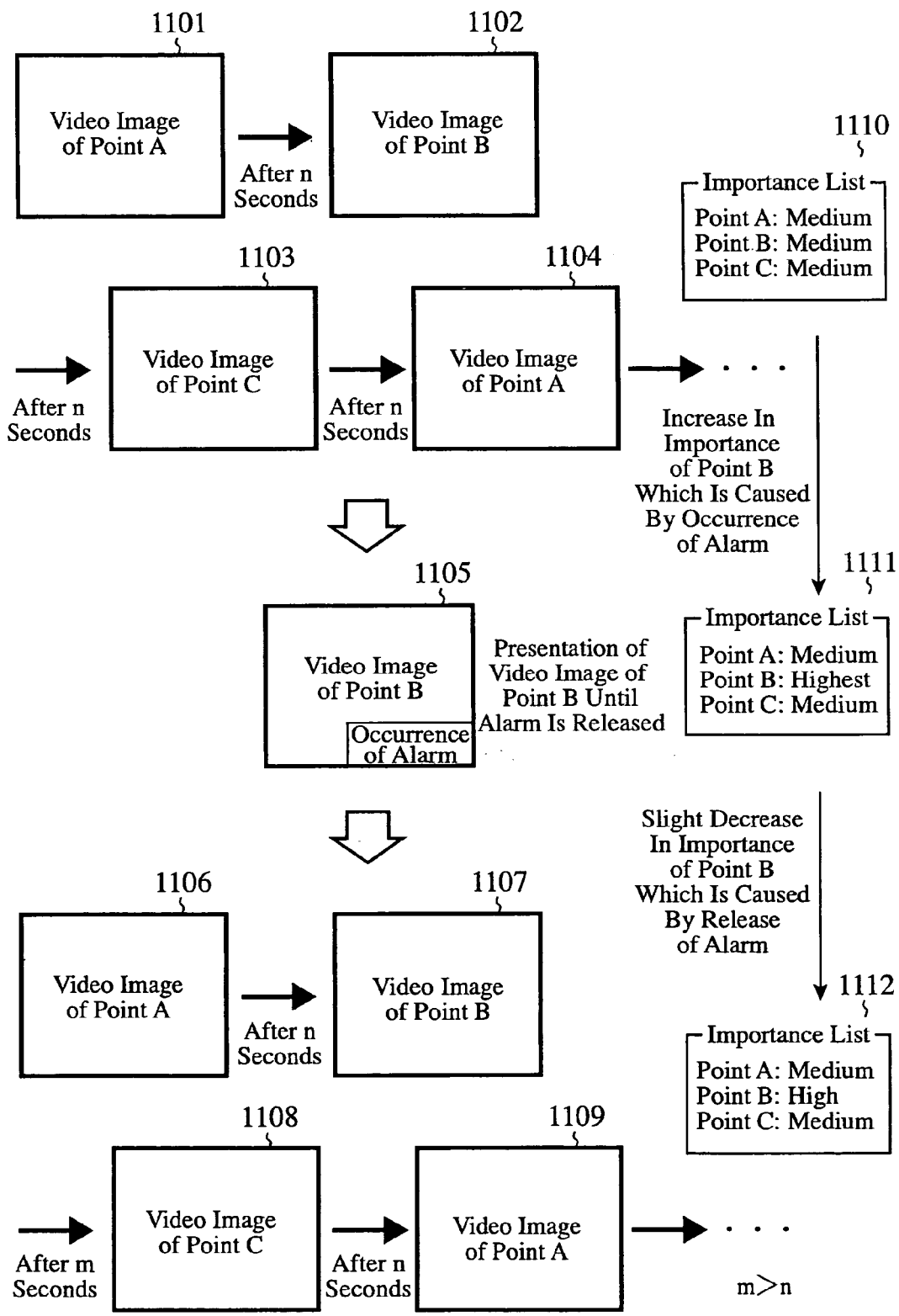
FIG. 22 is a diagram showing an example of switching between presentation layouts when a degree of media importance is changed in a case of simultaneously monitoring three points in accordance with embodiment 1 of the present invention.

FIG. 22 is a diagram showing an example of switching between presentation layouts when the degree of media importance 204 assigned to media data is changed in a case of simultaneously monitoring three points (e.g., points A to C).

In this case, when an alarm is issued and then the degree of media importance 204 assigned to the point B increases while a video image 1101 of point A, a video image 1102 of point B, a video image 1103 of point C, and a video image 1104 of point A are transmitted one by one to the media receiving apparatus and are presented one by one by the media receiving apparatus based on a list of degrees of importance 1110 in which no media importance 204 has been changed yet, only a video image 1105 of point B will be transmitted to the media receiving apparatus and will be presented by the media receiving apparatus based on the changed list of degrees of importance 1111. After that, when the alarm is released, and the degree of media importance 204 assigned to the point B decreases slightly, a video image 1106 of point A, a video image 1107 of point B, a video image 1108 of point C, and a video image 1109 of point A are transmitted one by one to the media receiving apparatus and are presented one by one by the media receiving apparatus based on the further-changed list of degrees of importance 1112.

Figure 23:
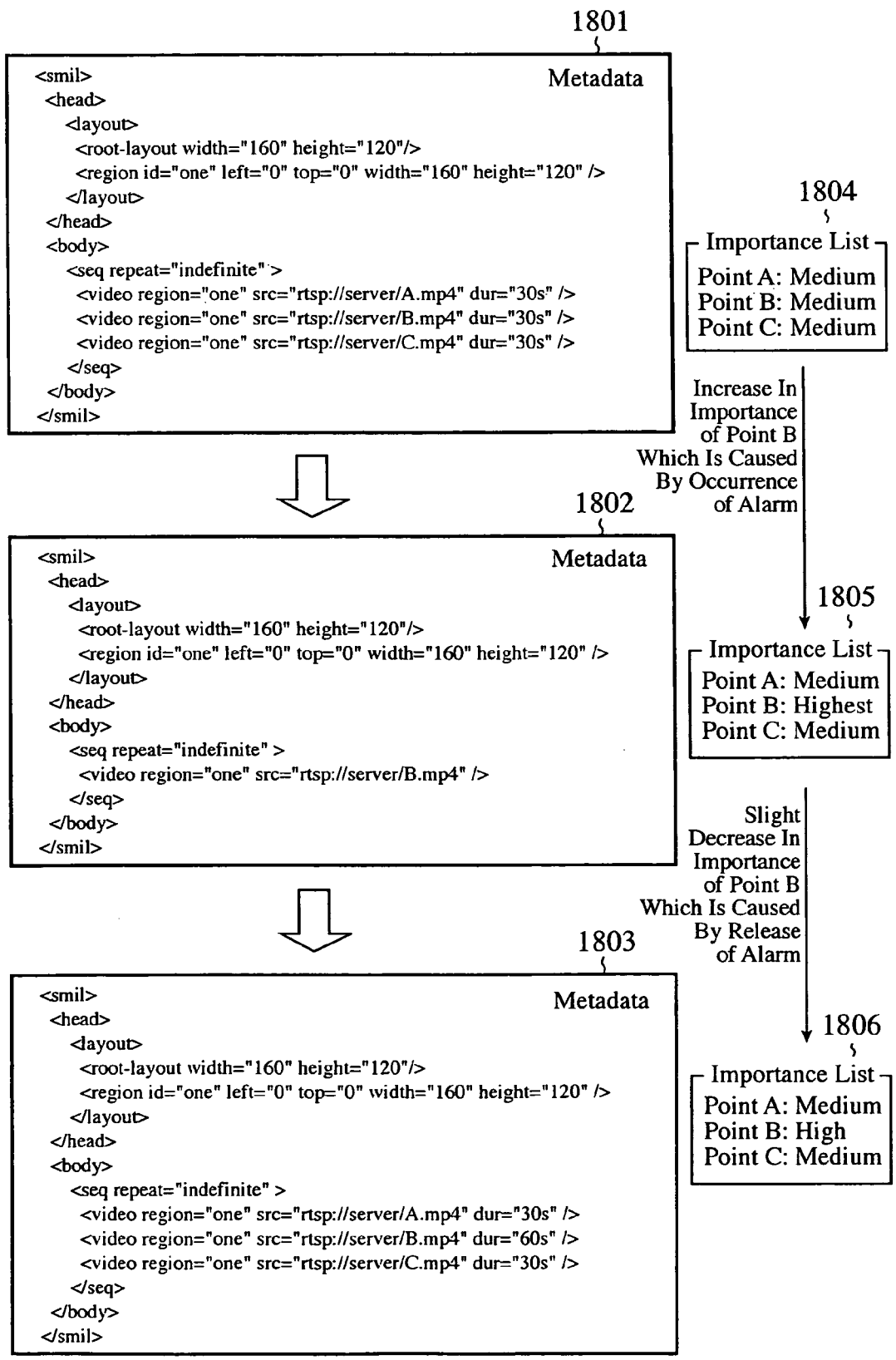
FIG. 23 is a diagram showing an example of change in the metadata when the degree of media importance is changed in accordance with embodiment 1 of the present invention.

FIG. 23 is a diagram showing an example of change in the metadata in a case where the degree of media importance 204 assigned to media data is changed, like FIG. 22. In this example, a case where metadata 1801 based on a list of importance degrees 1804 is changed to metadata 1802 based on a list of importance degrees 1805 because of increase in the importance assigned to the point B, and is further changed to metadata 1803 based on a list of importance degrees 1806 because of slightly decrease in the importance assigned to the point B is shown.

This example is the example in which video image of points whose importance is greater than "medium degree of importance" are presented one by one, and, when a video image of a point whose importance is "the highest degree of importance" exists, only the vide image is presented until the importance assigned to the point is changed from "the highest degree of importance" to a lower degree of importance.

In a case of assignment of importance as shown in the importance list 1110 of FIG. 22, the media delivering apparatus 401 delivers the metadata 1801 of FIG. 23 used for delivery of media data, which causes sequential presentation of the media data, such as presentation of the video image 1101 of point A, video image 1102 of point B, video image 1103 of point C, and video image 1104 of point A, to the media receiving apparatus 402. The media receiving apparatus 402 receives the metadata 1801, and issues a request 208 for delivery of the media data 205 based on the address information described in the metadata. The media delivering apparatus 401 receives the request 208, and performs a delivery 210 of the media data 205 to the media receiving apparatus 402. The media receiving apparatus 402 receives the media data 205 delivered thereto, and presents the video image 1101 of point A, video image 1102 of point B, video image 1103 of point C, and video image 1104 of point A in the order that they are delivered thereto based on the presentation layout information described in the metadata 1801. The timing at which the media receiving apparatus switches among the video images is described in the metadata 1801, and the media receiving apparatus 402 issues a request 208 for delivery of the media data 205 at the timing at which it switches among the video images based on the address information described in the metadata, and switches among the presented images one by one.

After that, when an alarm is issued from the point B and the importance list is changed to an importance list 1111 of FIG. 22 as a result, the media delivering apparatus 401 delivers the metadata 1802 of FIG. 23 which is used for changing the presentation layout to the media receiving apparatus 402 in order to cause presentation of only the video image of point B. When receiving the metadata 1802, the media receiving apparatus 402 suspends the presentation of the media data 205 currently being presented, and then issues a request 208 for delivery of the media data 205 based on the address information described in the metadata 1802 which the media receiving apparatus has newly received. The media delivering apparatus 401 receives the request 208, and performs a delivery 210 of the media data 205 to the media receiving apparatus 402. The media receiving apparatus 402 receives the media data 205 delivered thereto, and presents only the video image 1105 of point B based on the presentation layout information described in the metadata 1802 which the media receiving apparatus has newly received.

Furthermore, after that, when an alarm issued from the point B is released, and the importance list is changed to an importance list 1112 of FIG. 22, the media delivering apparatus 401 delivers the metadata 1803 of FIG. 23 which is used for carrying out a delivery of video images and which causes sequential presentation of the media data, such as presentation of the video image 1106 of point A, video image 1107 of point B, video image 1108 of point C, and video image 1109 of point A shown in FIG. 22, to the media receiving apparatus 402. When receiving the metadata 1803 shown in FIG. 23, the media receiving apparatus 402 suspends the presentation of the media data 205 currently being presented, and then issues a request 208 for delivery of the media data 205 based on the address information described in the metadata 1803 which the media receiving apparatus has newly received. The media delivering apparatus 401 receives the request 208, and performs a delivery 210 of the media data 205 to the media receiving apparatus 402. The media receiving apparatus 402 receives the media data 205 delivered thereto, and sequentially presents the video image 1106 of point A, video image 1107 of point B, video image 1108 of point C, and video image 1109 of point A based on the presentation layout information described in the metadata 1803 which the media receiving apparatus has newly received. The timing at which the media receiving apparatus switches among the video images is described in the metadata 1803 shown in FIG. 23, and the media receiving apparatus 402 issues a request 208 for delivery of the media data 205 at the timing at which it switches among the video images based on the address information described in the metadata, and switches among the presented images one by one.

In FIG. 17, when the degree of media importance 204 assigned to media data is changed, the media delivering apparatus 401 can use a method of transmitting, as a change command 406, only a difference between the yet-to-be-updated metadata and the updated metadata instead of updating the metadata 306 and then delivering the whole of the updated metadata 406 to the media receiving apparatus 402.

FIG. 24 is a diagram showing an example of the definition of the format of the change command, and an example of the metadata. There are an add command (addition), a replace command (replacement), and a delete command (deletion) as examples of the change command, and an operation about element and attribute can be performed on each command, as shown in a change command format list 2401. A time at which a command is executed can be omitted, and the command is executed immediately when the execution time is omitted. An absolute node shows a layer position of the metadata and each change command is associated with a layer of the metadata 2402 using an absolute node correspondence table 2403. In accordance with this embodiment 1, the change command is not limited to the examples shown in FIG. 24.

An example of using the change command defined as shown in FIG. 24 will be explained.

FIG. 25 is a diagram showing an example of the change command. When updating the metadata, the media delivering apparatus 401 transmits a change command 1901 which corresponds to a difference between the metadata 1701 as shown in FIG. 21 and the metadata 1702 as shown in FIG. 25 to the media receiving apparatus, instead of sending the whole of the changed metadata 1702 of FIG. 21. The media receiving apparatus 402 receives the change command 1901 of FIG. 25, refers to the metadata 1701 of FIG. 21 which it has already received, and changes the metadata 1701 based on the change command 1901. When the metadata 1701 of FIG. 21 is updated using the change command 1901 of FIG. 25, the metadata 1701 changes to the metadata 1702 of FIG. 21. When receiving the change command 1901, the media receiving apparatus 402 suspends the presentation of the media data currently being received, updates the metadata 1701 based on the change command 1901, and then issues a request 208 for delivery of the media data 205 based on the address information described in the metadata 1702 to which the metadata 1701 has been changed. The media delivering apparatus 401 receives the request 208, and performs a delivery 210 of the media data 205 to the media receiving apparatus 402. The media receiving apparatus 402 receives the media data 205 delivered thereto, and provides a synchronous presentation of the media data based on the presentation layout information described in the metadata 1702 of FIG. 21 which has been newly created based on the change command 1901.

FIG. 26 is also a diagram showing an example of the change command. Also when updating the metadata 1802 and 1803, the media delivering apparatus 401 transmits both a change command 2001 of FIG. 26 which corresponds to a difference between the metadata 1801 and 1802 as shown in FIG. 23 and a change command 2002 of FIG. 26 which corresponds to a difference between the metadata 1802 and 1803 as shown in FIG. 23 to the media receiving apparatus, instead of sending the whole of the changed metadata 1802 and 1803. The media receiving apparatus 402 receives the change command 2001 of FIG. 26, refers to the metadata 1801 of FIG. 23 which it has already received, and changes the metadata 1801 based on the change command 2001. When the metadata 1801 of FIG. 23 is updated using the change command 2001 of FIG. 20, the metadata 1801 changes to the metadata 1802 of FIG. 23. Similarly, when the metadata 1802 of FIG. 23 is updated using the change command 2002 of FIG. 26, the metadata 1802 changes to the metadata 1803 of FIG. 23. Every time when receiving the change commands 2001 and 2002, the media receiving apparatus 402 suspends the presentation of the media data currently being received, and issues a request 408 for delivery of the media data 205 based on the address information described in the changed metadata 1802 and 1803. The media delivering apparatus 401 receives the request 208, and performs a delivery 210 of the media data 205 to the media receiving apparatus 402. The media receiving apparatus 402 receives the media data 205 delivered thereto, and provides a synchronous presentation of the media data based on the presentation layout information described in the metadata 1802 and 1803 which have been newly created based on the change commands 2001 and 2002.

Thus, the present embodiment offers an advantage of, when the degree of media importance 204 assigned to media data is changed, being able to reduce the amount of metadata to be delivered to the media receiving apparatus by sending a change command for changing the metadata which has been already delivered to the media receiving apparatus.

As mentioned above, in accordance with this embodiment 1, the media delivering apparatus 301 creates metadata 306 in which both address information media data 205 and presentation layout information about a layout of the media data 205 are described by taking into consideration the communication capability 312 of the network 203 and the receiving capability 313 of the media receiving apparatus 202, as well as the degree of media importance 204 assigned to each media data, and delivers the metadata to the media receiving apparatus 202, and the media receiving apparatus 202 presents the media data 205 based on the metadata 306 delivered thereto. Therefore, the present embodiment offers an advantage of being able to present media data 205 normally, and to deliver the media data 205 which are adapted to each media receiving apparatus 202.

Furthermore, in accordance with this embodiment 1, the media delivering apparatus 401 creates metadata 406 in which both address information about media data 205 and presentation layout information about a layout of the media data 205 are described by taking into consideration the communication capability 312 of the network 203 and the receiving capability 313 of the media receiving apparatus 402, as well as the changed degree of media importance 204, and delivers the metadata to the media receiving apparatus 402, and the media receiving apparatus 402 presents the media data 205 based on the metadata 406 delivered thereto. Therefore, the present embodiment offers another advantage of being able to present media data 205 normally even when the degree of media importance 204 assigned to each media data is changed, and to deliver the media data 205 which are adapted to each media receiving apparatus 402.

In addition, in accordance with this embodiment 1, when the degree of media importance 204 assigned to media data is changed, the media delivering apparatus 401 delivers a change command 406 for changing the delivered metadata which has been already delivered to the media receiving apparatus. Therefore, the present embodiment offers a further advantage of being able to reduce the amount of metadata.

Embodiment 2

Also in this embodiment 2, although an explanation will be made assuming that media data 205 is surveillance video image data encoded with MPEG-4 Visual, metadata is written in SMIL, RTP is used as a media delivery protocol and RTSP is used as a media delivery control protocol, this embodiment 2 is not limited to this specific example from a workable standpoint.

In accordance with above-mentioned embodiment 1, only the degree of media importance 204 assigned to each media data 205 at the current time is known, while a degree of media importance which will be assigned to any media data in future is unknown. That is, when the degree of media importance 204 assigned to media data is changed, the media delivering apparatus 401 needs to notify the media receiving apparatus 402 that the degree of media importance 204 assigned to the media data is changed using the metadata 406 or a change command 406.

In this embodiment 2, a case where a time-varying degree of media importance is assigned to each media data 205 in advance will be explained. That is, in accordance with this embodiment 2, a plurality of media data 205, as well as the time-varying degree of media importance assigned to each media data 205, are stored in the media delivering apparatus in advance, and the media delivering apparatus searches for media data 205 to be delivered and creates metadata by setting the time-varying degree of media importance and so on as parameters.

Figure 27:
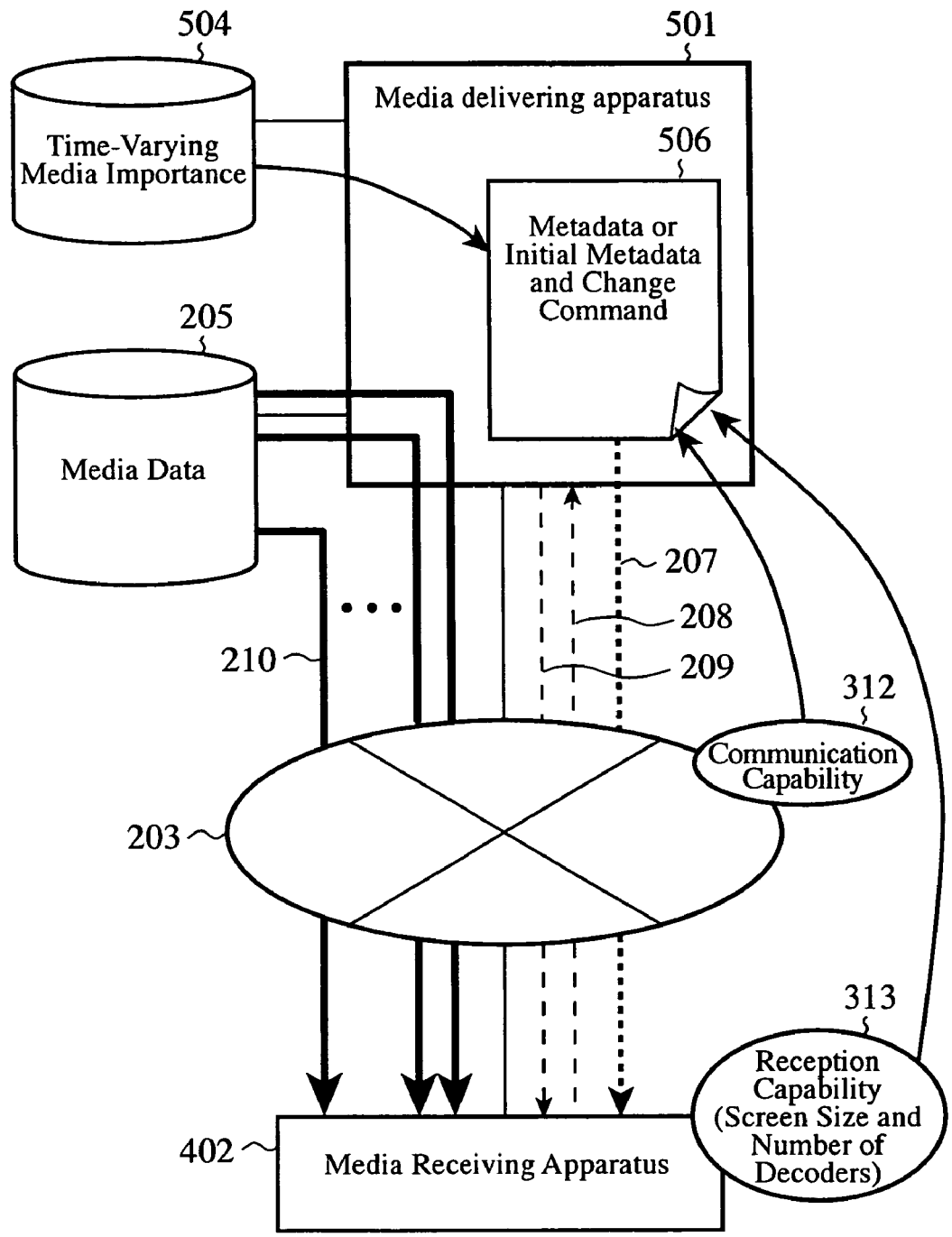
FIG. 27 is a diagram explaining a media delivery system which uses metadata in accordance with embodiment 2 of the present invention.

FIG. 27 is a diagram explaining a media delivery system which uses metadata in accordance with embodiment 2 of the present invention. In FIG. 27, a media delivering apparatus 501 is connected to a media receiving apparatus 402 by way of a network 203, and can access the time-varying degree of media importance 504 assigned to any media data 205 and any media data 205.

The operation of the media delivery system shown in FIG. 27 will be explained.

There is one or more media data 205 in the media delivery system, and a time-varying degree of media importance 504 is assigned to each media data 205. Each media data 205 has an address which is uniquely discriminable within the system. In this embodiment 2, the time-varying degree of media importance 504 assigned to each media data has a time-varying broadening, that is, the time-varying degree of media importance is stored in a form of having time-varying variations. The media delivering apparatus 501 differs from the media delivering apparatus 401 of FIG. 17 in that it additionally has a function of creating metadata 506 having the time-varying degree of media importance 504 as a parameter. To be more specific, when receiving a request for delivery of media data from the media receiving apparatus 402, the media delivering apparatus 501 uses one or more of parameters shown in the following (b) to (d) in addition to a parameter shown in the following (f): (b) The communication capability 312 of the network 203 (c) The screen size as the receiving capability 313 of the media receiving apparatus 402 (d) The decoding capability as the receiving capability 313 of the media receiving apparatus 402 (f) The time-varying degree of media importance 504

Thus, by using one or more of the parameters shown in (b) to (d) in addition to the parameter shown in (f), and by taking into consideration not only the time-varying degree of media importance 204 but the communication capability 312 of the network 203 and the receiving capability 313 of the media receiving apparatus 402, the media delivering apparatus selects one or more media data 205 to be delivered, creates metadata 506 in which address information about the location of each selected media data 205 and time-varying presentation layout information are described by taking into consideration variations in the presentation layout which are delivered to the media receiving apparatus in advance according to the time-varying degree of media importance 504, and carries out a delivery 207 of the metadata 506 to the media receiving apparatus 402. The media receiving apparatus 402 receives the metadata 506, and issues a request 208 for delivery of the media data 205 based on the address information described in the metadata. The media delivering apparatus 501 receives the request 208, sends a request response 209 to the media receiving apparatus 402, and carries out a delivery 210 of the media data 205 to the media receiving apparatus. The media receiving apparatus 402 receives the media data 205 delivered thereto, and provides a presentation of the media data 205 based on the time-varying presentation layout information described in the metadata 506. The timing at which the media receiving apparatus switches among the video images is described in the metadata 506, and the media receiving apparatus 402 issues a request 208 for delivery of the media data 205 at the timing at which it switches among the video images based on the address information described in the metadata, and switches among the presented images one by one.

The media delivering apparatus 501 can create "minimum amount of initial metadata required for starting presentation of media data, and change command associated with a subsequently-changed portion" 506, instead of the metadata 506, and can perform a delivery 507 of the initial metadata and change command to the media receiving apparatus. In this case, the change command includes an execution time at which it is executed. In the case of such the "initial metadata and change command" 506, the media receiving apparatus 402 interprets the change command at the execution time when the change command is executed so as to update the metadata which is being executed. This variant offers the same advantage by performing such processing, like the above-mentioned example in which the media receiving apparatus receives the whole metadata 506 in which all time-varying variations are included. In general, since "initial metadata and change command" 506 has a smaller amount of data than the whole metadata 506, and provides the same advantage, it comes in useful.

Figure 28:
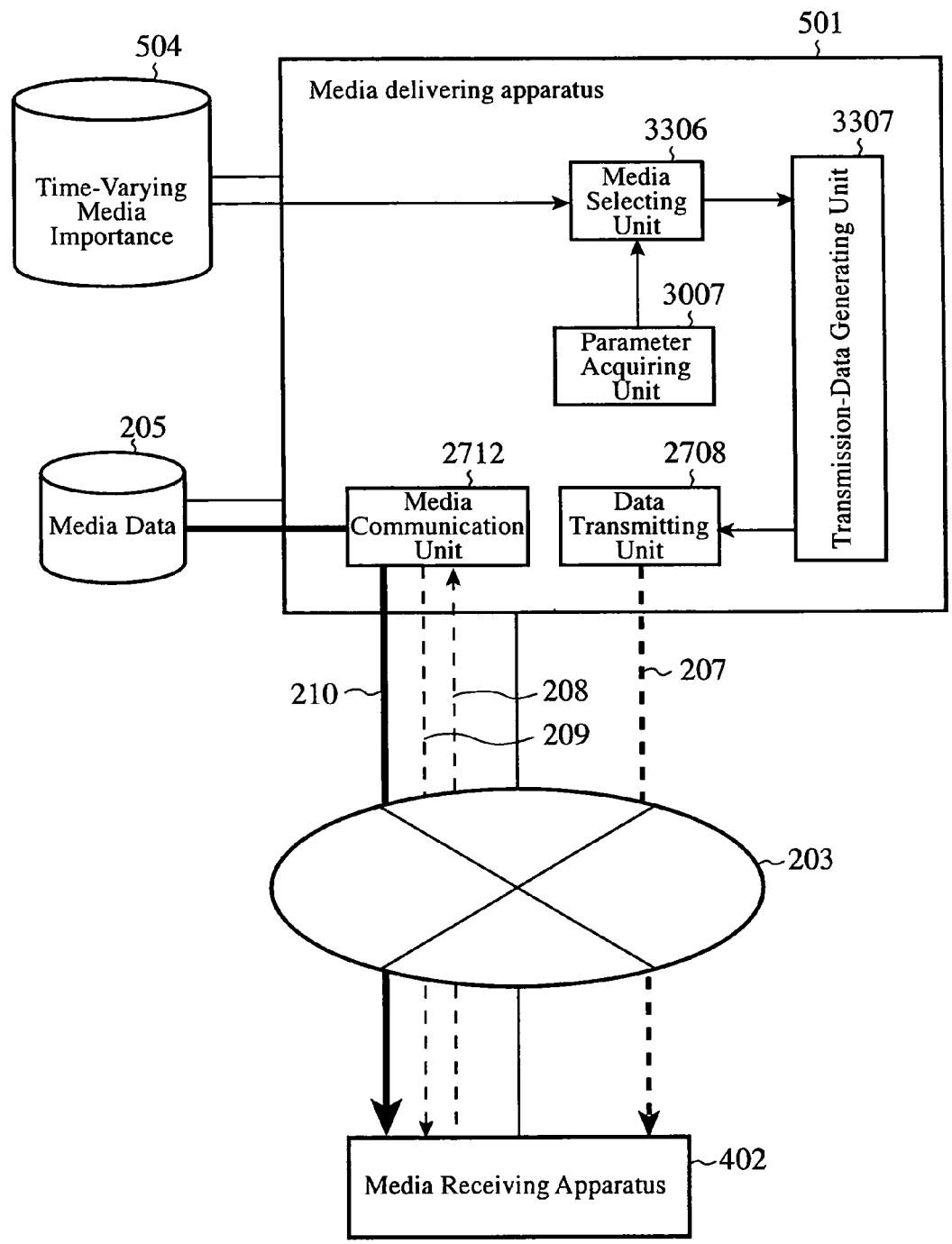
FIG. 28 is a block diagram showing the internal structure of a media delivering apparatus in accordance with embodiment 2 of the present invention.

FIG. 28 is a block diagram showing the internal structure of the media delivering apparatus 501. This media delivering apparatus 501 differs from the media delivering apparatus 401 of FIG. 18 in that the time-varying degree of media importance 504 is provided instead of the degree of media importance 204 and therefore the importance change monitoring unit 3106 is omitted, a media selecting unit 3306 is provided instead of the media selecting unit 3107, and a transmission-data generating unit 3307 is provided instead of the transmission-data generating unit 3109.

The operation of the media delivering apparatus shown in FIG. 28 will be explained.

The media selecting unit 3306 differs from the media selecting unit 3107 in that it additionally has a function of performing a selection of media data by setting the time-varying degree of media importance 504 as parameters.

That is, the media selecting unit 3306 selects media data 205 to be delivered in consideration of the time-varying degree of media importance assigned to each media data in advance by selecting media data 205 to be delivered based on the time-varying degree of media importance 504 assigned to each media data and at least one of the communication capability 312 of the network 203, and the receiving capability 313 of the media receiving apparatus 402, and notifies the selected media data to the transmission-data generating unit 3307.

The transmission-data generating unit 3307 creates metadata 506 in which both address information indicating the location of each selected media data 205 and presentation layout information indicating a layout of the media data on the screen of the media receiving apparatus 402, which is determined based on both the time-varying degree of media importance 504 assigned to each selected media data 205 and at least one of the communication capability 312 of the network 203 and the receiving capability 313 of the media receiving apparatus 402, are described, and outputs the metadata, or creates, as well as initial metadata at the time of start of the presentation in which both the address information indicating the location of each selected media data 205 and the presentation layout information indicating a layout of the media data on the screen of the media receiving apparatus 402, which is determined based on both the time-varying degree of media importance 504 assigned to each selected media data 205 and at least one of the communication capability 312 of the network 203 and the receiving capability 313 of the media receiving apparatus 402, are described, a change command for changing the initial metadata according to time-varying variations in the time-varying degree of media importance 504, and outputs the created "initial metadata and change command" 506.

Thus, the transmission-data generating unit 3307 creates either metadata 506 about the media data 205 selected by the media selecting unit 3306, or "initial metadata and change command" 506, and then delivers it to the data transmitting unit 2708. The explanation of the change command is already done with reference to FIG. 24. The other operations of the media delivering apparatus are the same as those of the media delivering apparatus 401 of FIG. 18.

A surveillance system will be explained with reference to FIG. 27 as an example of the media delivery system. An explanation will be given for a case in which all the parameters shown in the above-mentioned (b) to (d) and shown in the above-mentioned (f) are used, and the communication capability 312 of the network 203 and the receiving capability 313 of the media receiving apparatus 402 are all high in the example of FIG. 27.

FIG. 29 is a diagram showing an example of the metadata 506 in a case the time-varying variations in the degree of media importance and the time when the degree of media importance is changed are known in advance. This diagram shows a case where surveillance video images of points A to E at 14:00 to 14:30 are monitored, and change in the presentation layout is set up while increase in the importance assigned to the point B is taken into consideration in advance, as shown in lists of degrees of importance 2104 and 2105. In this metadata 2101, a par tag 2102 shows that a simultaneous presentation of media data 205 specified by a text closed by </par> is provided, dur shows a presentation time, and begin of each video tag 2103 shows a start time of presentation.

The media delivering apparatus 501 creates metadata which causes a transition from a presentation layout of images at 14:00 to 14:10, such as images displayed on the entire screen 1001 of FIG. 20, to a presentation layout of images at 14:10 to 14:30, such as images displayed on the entire screen 1002 of FIG. 20, and performs a delivery 207 of the metadata 2101 as shown in FIG. 29 which causes the transition to the media receiving apparatus 402. The media receiving apparatus 402 receives the metadata 2101 of FIG. 29, and issues a request 208 for delivery of the media data 205 based on the address information described in the first half of the metadata 2101. The media delivering apparatus 501 receives the request 208, and then performs a delivery 210 of the media data 205 to the media receiving apparatus 402. The media receiving apparatus 402 receives the media data 205 delivered thereto, and presents the media data so that they have a presentation layout on the entire screen 1001 of FIG. 20 based on the time-varying presentation layout information described in the metadata 2101.

After that, when the presentation time reaches 14:10, the media receiving apparatus 402 suspends the presentation of the media data 205 currently being presented, and performs a request 208 for delivery of the media data 205 based on the address information described in the latter half of the metadata 2101 of FIG. 29. The media delivering apparatus 501 receives the request 208, and performs a delivery 210 of the media data 205 to the media receiving apparatus 402. The media receiving apparatus 402 receives the media data 205 delivered thereto, and presents the media data so that they have a presentation layout on the entire screen 1002 of FIG. 20 based on the time-varying presentation layout information described in the metadata 2101.

Figure 30:
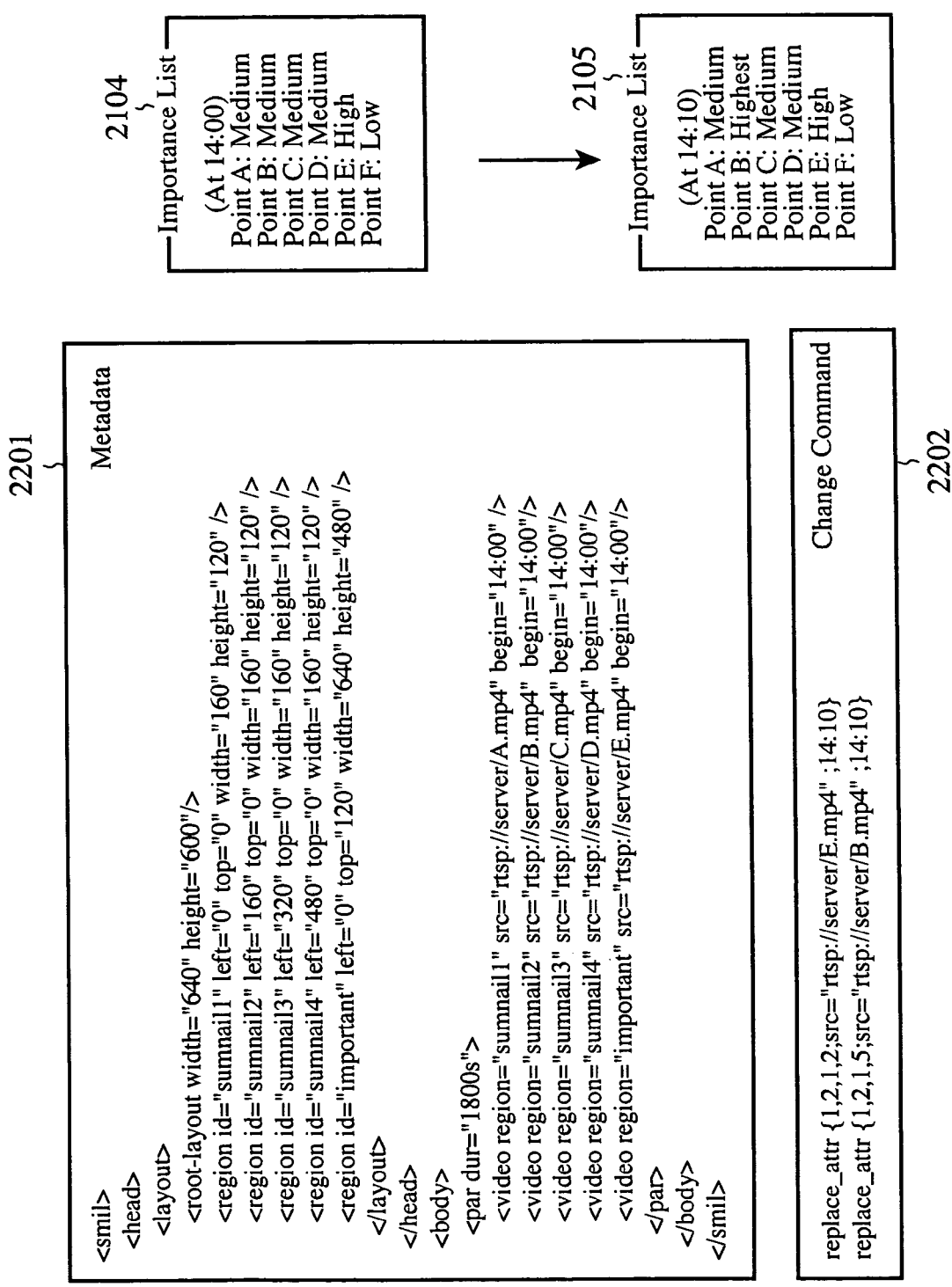
FIG. 30 is a diagram showing an example of the metadata and a change command in a case where a time-varying variation in a degree of media importance and a time when the degree of media importance is changed are known in advance in the media delivering apparatus in accordance with embodiment 2 of the present invention.

FIG. 30 is a diagram showing an example of "initial metadata and change command" 506 in a case where the time-varying variations in the degree of media importance and the time when the degree of media importance is changed are known in advance. The same effect is produced even if a change command 2202 containing initial metadata 2201 at the start time of presentation, which is least required at the start time of presentation, and the change time are transmitted simultaneously as shown in FIG. 30, instead of the metadata 2101 of FIG. 29. Thus, the use of the change command 2202 makes it possible to produce the same effect with a smaller amount of data than in the case of transmission of all of the metadata 2101.

Although FIG. 29 shows an example of monitoring six points in a case where the time-varying variations in the degree of media importance and the time when the degree of media importance is changed are known in advance, as an example of surveillance application, there can be provided an application example of, when monitoring two or more sections, for example, two or more buildings, the above-mentioned six points belonging to the same section, creating metadata 506 dynamically based on a degree of importance assigned to a specified time period within the section when triggered by a request for delivery of video images captured for the section during the specified time period, which is issued by the user of the media receiving apparatus 402, and delivering the metadata to the media receiving apparatus 402 by means of the media delivering apparatus 501. In the case of such a surveillance application example, the media receiving apparatus 402 can allow the user to select a section for which it makes a request for delivery of video images and to specify the date and time of starting presentation of the video images, and the media delivering apparatus 501 creates metadata 506 based on the importance at the start time of presentation which is effective only in the section selected by the user.

It can be also considered that the media delivering apparatus 501 offers information which enables the user to specify the date and time of starting presentation of the video images.

In this case, when the user of the media receiving apparatus 402 specifies a specific time period and a threshold (e.g., a medium or high degree of importance) for the media delivering apparatus 501, for example. The media delivering apparatus 501 refers to the time-varying degree of media importance 504, and notifies the time which falls within the time period specified by the user and when the time-varying degree of media importance 504 exceeds the threshold for media importance to the media receiving apparatus 402. In this application example, the user of the media receiving apparatus 402 can specify the date and time of starting presentation of the video images based on the information notified from the media delivering apparatus.

FIG. 31 is a diagram showing an example of the presentation layout and an example of the metadata in a case of simultaneously monitoring four points (e.g., points A to D). This example shows a case where a video image 2302 of point A, a video image 2303 of point B, a video image 2304 of point C, and a video image 2305 of point D are displayed on the entire screen 2301 based on a list of degrees of importance 2306, and a large number of video images at times which alarms were respectively issued at different points are checked at a time and at any time. The metadata 2307 is used to implement this example.

In the example of FIG. 27, when all the parameters shown in the above-mentioned (b) to (d) and (f) are used, the communication capability 312 of the network 203 and the receiving capability 313 of the media receiving apparatus 402 are all high, and the degree of media importance assigned to media data captured at each of the plurality of points is known in advance as shown in FIG. 31. The media delivering apparatus 501 creates either metadata 2307 or "initial metadata and change command" for carrying out simultaneous presentation of video images respectively captured at the plurality of points and at times each having a high degree of importance so as to produce a presentation layout of the video images respectively captured at the plurality of points on the entire screen 2301 shown in FIG. 31. While the example of FIG. 29 is the one in which a simultaneous presentation of video images captured at an identical time is provided, and the example of FIG. 30 is the one in which an enlarged display of a video image of a point having a high degree of media importance is carried out, the example of FIG. 31 is the one in which the highest degree of importance means generation of an alarm, and the user is allowed to check a large number of video images at times which alarms were respectively issued at different points at a time and at any time.

Figure 32:
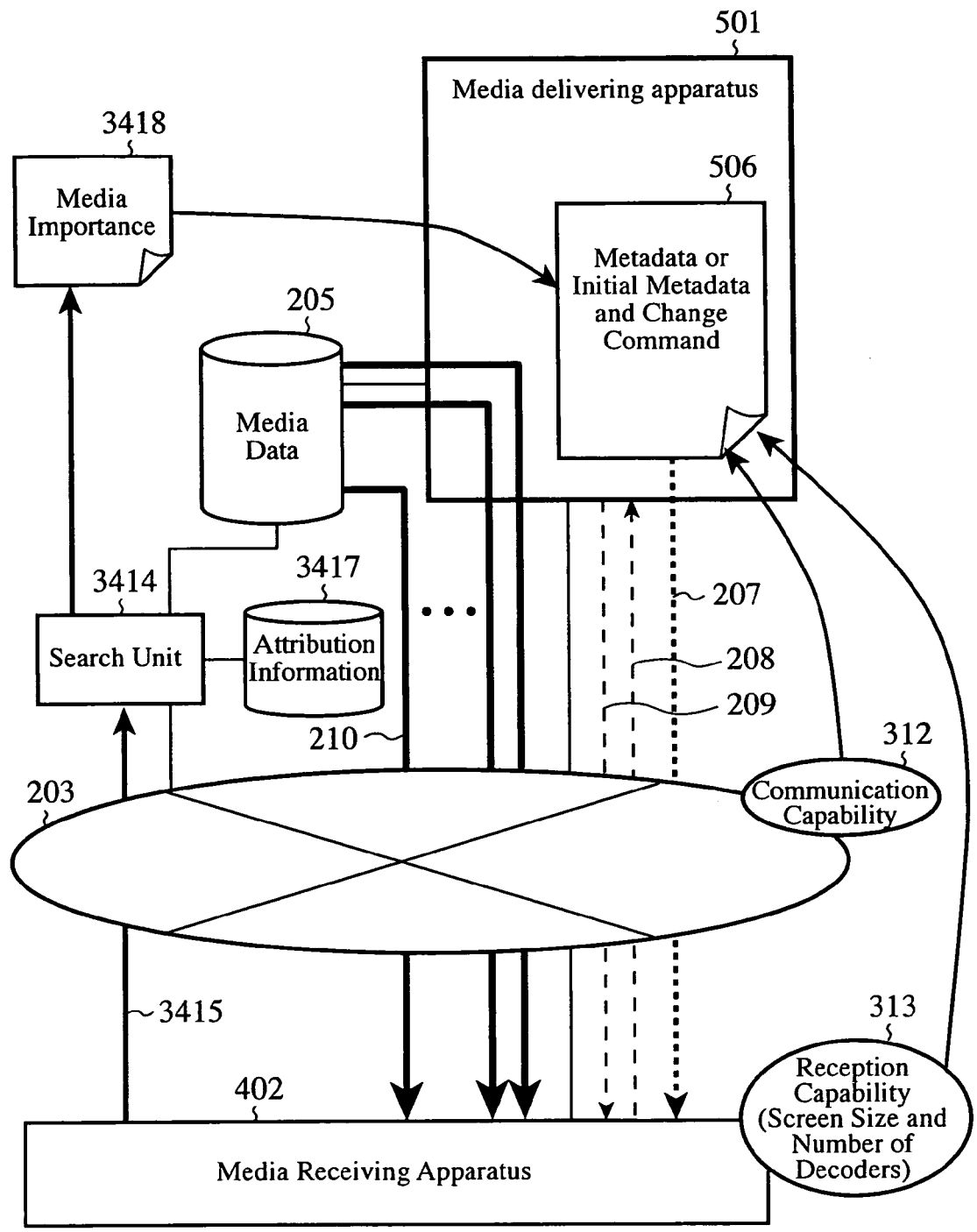
FIG. 32 is a diagram explaining another example of the media delivery system which uses metadata in accordance with embodiment 2 of the present invention.

FIG. 32 is a diagram for explaining another example of the media delivery system in accordance with embodiment 2 of the present invention. This media delivery system differs from the media delivery system of FIG. 27 in that a search unit 3414 and attribution information 3417 are additionally provided, and a degree of media importance 3418 created by the search unit 3414 is disposed instead of the time-varying degree of media importance 504.

The operation of the media delivery system shown in FIG. 32 will be explained.

In this example, it is assumed that the attribution information 3417 includes alarm information associated with each media data 205. The media receiving apparatus 402 gets access 3415 to a search unit 3414 according to, for example, such a keyword as "occurrence of abnormal conditions in temperature sensor." The search unit 3414 refers to the attribution information 3417 associated with each media data 205, and creates a degree of media importance 3418 according to each media data 205 associated with an alarm indicating "occurrence of abnormal conditions in temperature sensor." For example, the search device 3414 creates media importance data 3418 in which a "medium degree" of media importance is assigned to each media data 205 associated with an alarm indicating "occurrence of abnormal conditions in temperature sensor", while a "high degree" of media importance is assigned to media data 205 associated with a most-recently-issued alarm indicating "occurrence of abnormal conditions in temperature sensor." The media delivering apparatus 501 sets, as parameters, the created media importance data 3418, the communication capability 312 of the network 203 and the receiving capability 313 of the media receiving apparatus 402, dynamically determines a presentation layout to be delivered, creates either metadata 506 or "initial metadata and change command" 506, and performs a delivery 207 of the metadata or "initial metadata and change command" to the media receiving apparatus 402. To be more specific, the media delivering apparatus 501 selects media data 205 to be delivered based on the created media importance data 3418. Therefore, the media delivering apparatus selects, as the media data 205 to be delivered, a plurality of media data 205 each associated with an alarm indicating "occurrence of abnormal conditions in temperature sensor." The number of media to be delivered simultaneously and the quality of each media to be delivered are determined by the media delivering apparatus 501 based on the parameters, such as the communication capability 312 of the network 203 and the receiving capability 313 of the media receiving apparatus 402, as in the case of any above-mentioned embodiment. For example, when the communication capability 312 and the receiving capability 313 are all high, the media delivering apparatus creates a presentation layout of the selected media data on an entire screen 601 as shown in FIG. 10. In this presentation layout, media data 205 having a "high degree" of importance is displayed with a VGA resolution, and each remaining media data 205 having a "medium degree" of importance is displayed with an SQVGA resolution. In contrast, when the communication capability 312 and the receiving capability 313 are all low, the media delivering apparatus sets the number of video images to be delivered at a time to 1, and creates a presentation layout of the selected media data such that media data 205 having a "high degree" of importance is started and, after that, remaining media data 205 each having a "medium degree" of importance are presented one by one.

The media delivering apparatus 501 selects media data 205 associated with an alarm indicating "occurrence of abnormal conditions in temperature sensor." Therefore, when simultaneously delivering a plurality of media data respectively associated with alarms indicating "occurrence of abnormal conditions in temperature sensor" which were issued at different times to the media receiving apparatus, the media delivering apparatus creates metadata 506 which causes a simultaneous delivery of the media data obtained at different times. Since the media delivering apparatus 501 creates such the metadata 506, the media receiving apparatus 402 can check the plurality of media data 205 which are search results which match with the search conditions simultaneously and efficiently. When receiving and presenting the plurality of media data obtained at different times simultaneously, the media receiving apparatus 402 presents the plurality of media data while achieving synchronization among the plurality of media data 205. Furthermore, even when the number of media data to be delivered simultaneously is one, since the plurality of media data are presented one by one in the order of importance, the user of the media receive terminal 402 can check the plurality of media data efficiently.

As mentioned above, in accordance with this embodiment 2, the media delivering apparatus 501 takes into consideration the communication capability 312 of the network 203 and the receiving capability 313 of the media receiving apparatus 402, as well as the time-varying degree of media importance 504 assigned to each media data, creates metadata 506 in which address information about each selected media data 205 and time-varying presentation layout information are described, and delivers the metadata 506 to the media receiving apparatus 402, and the media receiving apparatus 402 presents the media data 205 based on the metadata 506 delivered thereto. Therefore, the present embodiment offers an advantage of being able to present media data 205 normally and to deliver media data 205 which are adapted to each media receiving apparatus 402.

Furthermore, in accordance with this embodiment 2, the media delivering apparatus takes into consideration the communication capability 312 of the network 203 and the receiving capability 313 of the media receiving apparatus 402, as well as the time-varying degree of media importance 504 assigned to each media data, creates "initial metadata and change command" 506 in which address information about media data 205 and presentation layout information are described, and delivers the initial metadata and change command to the media receiving apparatus 402. Therefore, the present embodiment offers another advantage of being able to reduce the amount of metadata.

In addition, in accordance with this embodiment 2, the search unit 3414 creates media importance data 3418 corresponding to media data 205 which are searched using a predetermined keyword, the media delivering apparatus 501 takes into consideration the communication capability 312 of the network 203 and the receiving capability 313 of the media receiving apparatus 402, as well as the degree of media importance 3418 assigned to each media data, creates metadata 506 in which address information about each selected media data 205 and presentation layout information are described, and delivers the metadata 506 to the media receiving apparatus 402, and the media receiving apparatus 402 presents the media data 205 based on the metadata 506 delivered thereto. Therefore, the present embodiment offers a further advantage of being able to present media data 205 associated with the predetermined keyword normally and to deliver media data 205 which are adapted to each media receiving apparatus 402.

INDUSTRIAL APPLICABILITY

As mentioned above, a media delivering apparatus and a media receiving apparatus in accordance with the present invention are suitable for presenting media data 205 normally and delivering media data 205 which are adapted to each media receiving apparatus 202 by taking into consideration the communication capability 312 of a network 203 and the receiving capability 313 of the media receiving apparatus 202, as well as the degree of media importance 204 assigned to each media data, creating metadata 506 in which address information about each selected media data 205 and presentation layout information are described, and delivering the metadata 506 to the media receiving apparatus, and presenting the media data 205 based on the delivered metadata 506.

The invention claimed is:

1. A network system for delivering media data by way of a network, the network system comprises:
   a media delivering apparatus as a network server communicating to a media receiving apparatus, characterized in that said media delivering apparatus comprises:
   a parameter acquiring unit for acquiring at least one of a communication capability of said network, and a receiving capability of said media receiving apparatus as a parameter;
   a media selecting unit for selecting media data to be delivered based on both a degree of media importance as a parameter assigned to each of said media data and at least the one of said communication capability of said network and said receiving capability of said media receiving apparatus;
   a transmission-data generating unit for generating metadata in which both address information indicating a location of said selected media data and presentation layout information indicating a presentation layout of said media receiving apparatus which is determined based on both the degree of media importance of said selected media data and at least the one of said communication capability of said network and said receiving capability of said media receiving apparatus are described;
   a data transmitting unit for delivering said metadata to said media receiving apparatus by way of said network;
   a media communication unit for delivering said media data in response to a request from said media receiving apparatus which has received said metadata; and
   an importance change monitoring unit for changing said degree of media importance in response to a change indication for changing said degree of media importance, and for notifying the change in said degree of media importance to the media selecting unit, and characterized in that said media selecting unit selects the media data to be delivered based both the changed degree of media importance and at least the one of the communication capability of the network and the receiving capability of the media receiving apparatus, the transmission-data generating unit generates a change command for changing the metadata which is generated before said degree of media importance is changed based on both the changed degree of media importance and at least the one of the communication capability of the network and the receiving capability of the media receiving apparatus, and the data transmitting unit delivers said change command.

2. The media delivering apparatus according to claim 1, characterized in that said apparatus comprises an importance change monitoring unit for changing said degree of media importance in response to a change indication for changing said degree of media importance, and for notifying the change in said degree of media importance to the media selecting unit, and characterized in that said media selecting unit selects the media data to be delivered based on both the changed degree of media importance and at least the one of the communication capability of the network and the receiving capability of the media receiving apparatus, the transmission-data generating unit generates the metadata in which both the address information indicating the location of said selected media data which is selected based on both the changed degree of media importance and the presentation layout information indicating the presentation layout of said media receiving apparatus which is determined based on both the changed degree of media importance of said selected media data and at least the one of said communication capability of said network and said receiving capability of said media receiving apparatus are described, and the data transmitting unit delivers said changed metadata.

3. The media delivering apparatus according to claim 1, characterized in that the transmission-data generating unit describes metadata including synchronization information indicating a timing for switching between screen displays in the media receiving apparatus in the metadata.

4. The media delivering apparatus according to claim 1, characterized in that the transmission-data generating unit describes metadata including conditional branching information about at least the one of the communication capability of the network and the receiving capability of the media receiving apparatus which are used for determining the presentation layout of the media receiving apparatus.

5. A network system for delivering media data by way of a network, the network system comprises:
    a media delivering apparatus as a network server communicating to a media receiving apparatus, characterized in that said media delivering apparatus comprises:
    a parameter acquiring unit for acquiring at least one of a communication capability of said network, and a receiving capability of said media receiving apparatus as a parameter;
    a media selecting unit for selecting media data to be delivered based on both a time-varying degree of media importance as a parameter which is assigned to each of said media data, and at least the one of said communication capability of said network and said receiving capability of said media receiving apparatus;
    a transmission-data generating unit for generating metadata in which both address information indicating a location of said selected media data and presentation layout information indicating a presentation layout of said media receiving apparatus which is determined based on both the time-varying degree of media importance of said selected media data and at least the one of said communication capability of said network and said receiving capability of said media receiving apparatus are described;
    a data transmitting unit for delivering said metadata to said media receiving apparatus by way of said network;
    a media communication unit for delivering said media data based in response to a request from said media receiving apparatus which has received said metadata; and
    a importance change monitoring unit for changing said degree of media importance in response to a change indication for changing said degree of media importance, and for notifying the change in said degree of media importance to the media selecting unit, and characterized in that said media selecting unit selects the media data to be delivered based both the changed degree of media importance and at least the one of the communication capability of the network and the receiving capability of the media receiving apparatus, the transmission-data generating unit generates a change command for changing the metadata which is generated before said degree of media importance is changed based on both the changed degree of media importance and at least the one of the communication capability of the network and the receiving capability of the media receiving apparatus, and the data transmitting unit delivers said change command.

6. A network system for delivering media data by way of a network, the network system comprises:
    a media delivering apparatus as a network server communicating to a media receiving apparatus, characterized in that said media delivering apparatus comprises:
    a parameter acquiring unit for acquiring at least one of a communication capability of said network, and a receiving capability of said media receiving apparatus as a parameter;
    a media selecting unit for selecting media data to be delivered based on both a time-varying degree of media importance as a parameter which is assigned to each of said media data, and at least the one of said communication capability of said network and said receiving capability of said media receiving apparatus;
    a transmission-data generating unit for generating initial metadata at a time of start of presentation, in which both address information indicating a location of said selected media data and presentation layout information indicating a presentation layout of said media receiving apparatus which is determined based on both the time-varying degree of media importance of said selected media data and at least the one of said communication capability of said network and said receiving capability of said media receiving apparatus are described, and for generating a change command for changing said initial metadata according to a variation with time of said degree of media importance;
    a data transmitting unit for delivering said initial metadata and said change command to said media receiving apparatus by way of said network;
    a media communication unit for delivering said media data based in response to a request from said media receiving apparatus which has received said initial metadata and said change command; and
    a importance change monitoring unit for changing said degree of media importance in response to a change indication for changing said degree of media importance, and for notifying the change in said degree of media importance to the media selecting unit, and characterized in that said media selecting unit selects the media data to be delivered based both the changed degree of media importance and at least the one of the communication capability of the network and the receiving capability of the media receiving apparatus, the transmission-data generating unit generates a change command for changing the metadata which is generated before said degree of media importance is changed based on both the changed degree of media importance and at least the one of the communication capability of the network and the receiving capability of the media receiving apparatus, and the data transmitting unit delivers said change command.

7. A method for delivering media data by way of a network using a media delivering apparatus as a network server communicating to a media receiving apparatus, characterized in that said method comprises:

acquiring at least one of a communication capability of said network, and a receiving capability of said media receiving apparatus as a parameter;

selecting media data to be delivered based on both a degree of media importance as a parameter assigned to each of said media data and at least the one of said communication capability of said network and said receiving capability of said media receiving apparatus;

generating, metadata in which both address information indicating a location of said selected media data and presentation layout information indicating a presentation layout of said media receiving apparatus which is determined based on both the degree of media importance of said selected media data and at least the one of said communication capability of said network and said receiving capability of said media receiving apparatus are described;

delivering said metadata to said media receiving apparatus by way of said network;

delivering said media data in response to a request from said media receiving apparatus which has received said metadata;

changing said degree of media importance in response to a change indication for changing said degree of media importance, and for notifying the change in said degree of media importance to a media selecting unit;

selecting the media data to be delivered based both the changed degree of media importance and at least the one of the communication capability of the network and the receiving capability of the media receiving apparatus, generating a change command for changing the metadata which is generated before said degree of media importance is changed based on both the changed degree of media importance and at least the one of the communication capability of the network and the receiving capability of the media receiving apparatus; and delivering said change command.

8. The method according to claim 7, characterized in that said method comprises:

changing said degree of media importance in response to a change indication for changing said degree of media importance, and for notifying the change in said degree of media importance to a media selecting unit;

selecting the media data to be delivered based on both the changed degree of media importance and at least the one of the communication capability of the network and the receiving capability of the media receiving apparatus;

generating the metadata in which both the address information indicating the location of said selected media data which is selected based on both the changed degree of media importance and the presentation layout information indicating the presentation layout of said media receiving apparatus which is determined based on both the changed degree of media importance of said selected media data and at least the one of said communication capability of said network and said receiving capability of said media receiving apparatus are described, and delivering said changed metadata.

9. The method according to claim 7, further comprising describing metadata including synchronization information indicating a timing for switching between screen displays in the media receiving apparatus in the metadata.

10. The method according to claim 7, further comprising describing metadata including conditional branching information about at least the one of the communication capability of the network and the receiving capability of the media receiving apparatus which are used for determining the presentation layout of the media receiving apparatus.

11. A method of delivering media data to a media receiving apparatus by way of a network using a media delivering apparatus as a network server communicating to a media receiving apparatus, characterized in that said method comprises:

acquiring at least one of a communication capability of said network, and a receiving capability of said media receiving apparatus as a parameter;

selecting media data to be delivered based on both a time-varying degree of media importance as a parameter which is assigned to each of said media data, and at least the one of said communication capability of said network and said receiving capability of said media receiving apparatus;

generating metadata, in which both address information indicating a location of said selected media data and presentation layout information indicating a presentation layout of said media receiving apparatus which is determined based on both the time-varying degree of media importance of said selected media data and at least the one of said communication capability of said network and said receiving capability of said media receiving apparatus are described;

delivering said metadata to said media receiving apparatus by way of said network;

delivering said media data based in response to a request from said media receiving apparatus which has received said metadata;

changing said degree of media importance in response to a change indication for changing said degree of media importance, and for notifying the change in said degree of media importance to a media selecting unit;

selecting the media data to be delivered based both the changed degree of media importance and at least the one of the communication capability of the network and the receiving capability of the media receiving apparatus, generating a change command for changing the metadata which is generated before said degree of media importance is changed based on both the changed degree of media importance and at least the one of the communication capability of the network and the receiving capability of the media receiving apparatus; and delivering said change command.

12. A method for delivering media data to a media receiving apparatus by way of a network using a media delivering apparatus as a network server communicating to a media receiving apparatus, characterized in that said apparatus comprises:

acquiring at least one of a communication capability of said network, and a receiving capability of said media receiving apparatus as a parameter;

selecting media data to be delivered based on both a time-varying degree of media importance as a parameter which is assigned to each of said media data, and at least the one of said communication capability of said network and said receiving capability of said media receiving apparatus;

generating, initial metadata at a time of start of presentation, in which both address information indicating a location of said selected media data and presentation layout information indicating a presentation layout of said media receiving apparatus which is determined based on both the time-varying degree of media importance of said selected media data and at least the one of said communication capability of said network and said receiving capability of said media receiving apparatus are described, and for generating a change command for changing said initial metadata according to a variation with time of said degree of media importance;

delivering said initial metadata and said change command to said media receiving apparatus by way of said network;

delivering said media data based in response to a request from said media receiving apparatus which has received said initial metadata and said change command;

changing said degree of media importance in response to a change indication for changing said degree of media importance, and for notifying the change in said degree of media importance to a media selecting unit;

selecting the media data to be delivered based both the changed degree of media importance and at least the one of the communication capability of the network and the receiving capability of the media receiving apparatus, generating a change command for changing the metadata which is generated before said degree of media importance is changed based on both the changed degree of media importance and at least the one of the communication capability of the network and the receiving capability of the media receiving apparatus; and delivering said change command.

* * * * *